(12) United States Patent
Kocher et al.

(10) Patent No.: US 12,547,702 B2
(45) Date of Patent: *Feb. 10, 2026

(54) SECURE ENVIRONMENT REGISTER SYSTEM AND METHOD OF OPERATION

(71) Applicant: P4 X Group Inc., Miami, FL (US)

(72) Inventors: Robert William Kocher, McLean, VA (US); Douglas Earl Dyer, Herndon, VA (US); John Shelly Bowling, II, Reston, VA (US)

(73) Assignee: P4 X Group, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,425

(22) Filed: Oct. 31, 2024

(65) Prior Publication Data

US 2025/0053644 A1 Feb. 13, 2025

Related U.S. Application Data

(63) Continuation of application No. 18/581,345, filed on Feb. 19, 2024, now Pat. No. 12,164,626, which is a
(Continued)

(51) Int. Cl.
*G07B 15/00* (2011.01)
*G06F 21/53* (2013.01)

(52) U.S. Cl.
CPC ............ *G06F 21/53* (2013.01); *G07B 15/00* (2013.01); *G06F 2221/034* (2013.01); *G06Q 2240/00* (2013.01)

(58) Field of Classification Search
CPC ... G06F 21/53; G06F 2221/034; G07B 15/00; G06Q 2240/00
See application file for complete search history.

(56) References Cited

U.S. PATENT DOCUMENTS 6,389,402 B1 5/2002 Ginter et al.
7,143,062 B2 11/2006 Turk et al.
(Continued)

OTHER PUBLICATIONS

Caton, James Lee. "Cryptoliquidity: the blockchain and monetary stability." Journal of Entrepreneurship and Public Policy 9.2 (2019) : 227-252. (Year: 2019).*

(Continued)

*Primary Examiner* — Scott M Tungate
(74) *Attorney, Agent, or Firm* — Crowell & Moring LLP

(57) ABSTRACT

A system may include a physically secure environment configured to receive precious metal thereto, to retain precious metal therein, and release precious metal therefrom. A system may include a registration system configured to record and maintain records containing unique precious metal identification information, physically secure location information of precious metal, lot identification information of precious metal, and one of certification information or de-processing information of precious metal. A system may include allocating a portion of a total quantity of certified standard uniform characteristic (SUC) precious metal units in a first location within the physically secure environment to be associated with a first lot and creating a first private registry with corresponding records associated with the allocated portion of certified SUC precious metal units in the first location. A system may include authorizing at least one administrative privilege for the allocated SUC precious metal units of a lot for a trusted partner outside of the physically secure environment.

19 Claims, 15 Drawing Sheets

Related U.S. Application Data continuation-in-part of application No. 18/376,776, filed on Oct. 4, 2023, now Pat. No. 12,254,084, which is a continuation of application No. 17/986,037, filed on Nov. 14, 2022, now Pat. No. 11,797,666.

(60) Provisional application No. 63/282,012, filed on Nov. 22, 2021.

(56) References Cited

U.S. PATENT DOCUMENTS

| | | | |
|---|---|---|---|
| 8,032,436 | B2 | 10/2011 | Dailey et al. |
| 8,577,689 | B1 | 11/2013 | Czarnetzky |
| 8,626,641 | B1* | 1/2014 | Merk .................. G06Q 40/04 |
| | | | 705/37 |
| 9,990,625 | B2 | 6/2018 | Pitroda et al. |
| 10,140,658 | B1* | 11/2018 | Bagherzadeh ...... G06Q 20/381 |
| 10,970,549 | B1* | 4/2021 | Krishnan .............. G06V 20/20 |
| 11,386,492 | B1 | 7/2022 | Weiner |
| 2005/0044022 | A1 | 2/2005 | Spirgel et al. |
| 2007/0106612 | A1 | 5/2007 | O'Brien et al. |
| 2009/0076941 | A1 | 3/2009 | Schneierson et al. |
| 2009/0164328 | A1 | 6/2009 | Bishop et al. |
| 2009/0172035 | A1 | 7/2009 | Lessing et al. |
| 2011/0047062 | A1* | 2/2011 | Kerschner .............. G07F 17/00 |
| | | | 705/37 |
| 2012/0254009 | A1 | 10/2012 | Thorp |
| 2013/0073473 | A1 | 3/2013 | Heath |
| 2014/0025553 | A1 | 1/2014 | Jones et al. |
| 2014/0201033 | A1 | 7/2014 | Crain |
| 2015/0066728 | A1 | 3/2015 | Newall |
| 2017/0024818 | A1* | 1/2017 | Wager .................. H04L 9/3234 |
| 2019/0028276 | A1* | 1/2019 | Pierce ................ G06Q 20/3825 |
| 2019/0095987 | A1 | 3/2019 | Seergy et al. |
| 2019/0130484 | A1* | 5/2019 | de Jong .............. G06Q 20/401 |
| 2019/0188790 | A1 | 6/2019 | Lovato et al. |
| 2019/0251526 | A1 | 8/2019 | Jackson |
| 2019/0253256 | A1* | 8/2019 | Saab .................. G06Q 20/3823 |
| 2019/0337322 | A1* | 11/2019 | Tanko ................... B42D 25/22 |
| 2021/0082044 | A1 | 3/2021 | Sliwka |
| 2021/0158456 | A1* | 5/2021 | Morgan ................ G06Q 30/06 |
| 2021/0201299 | A1 | 7/2021 | Hilton |
| 2021/0256070 | A1 | 8/2021 | Tran et al. |
| 2023/0074283 | A1 | 3/2023 | Malcolm |
| 2023/0082841 | A1* | 3/2023 | Marsh ................... G06Q 40/08 |
| | | | 705/66 |
| 2024/0028706 | A1 | 1/2024 | Kocher et al. |
| 2024/0112172 | A1 | 4/2024 | Wilson et al. |

OTHER PUBLICATIONS

International Search Report and Written Opinion issued in App. No. PCT/US2023/036921, mailing date Dec. 21, 2023, 8 pages.

Morris, Charlie. "The London Bullion Market Association Issue Oct. 2, 79015." (2015). (Year: 2015).

International Search Report (PCT/ISA/220 and PCT/ISA/210) issued in PCT Application No. PCT/US2025/015573 dated May 19, 2025 (4 pages).

Written Opinion (PCT/ISA/237) issued in Application No. PCT/US2025/015573 dated May 19, 2025 (8 pages).

U.S. Non-Final Office Action issued in U.S. Appl. No. 19/041,958 dated Mar. 19, 2025 (16 pages).

U.S. Non-Final Office Action issued in U.S. Appl. No. 19/041,959 dated Mar. 20, 2025 (16 pages).

U.S. Non-Final Office Action issued in U.S. Appl. No. 19/041,957 dated Mar. 25, 2025 (14 pages).

U.S. Non-Final Office Action issued in U.S. Appl. No. 19/041,961 dated Mar. 31, 2025 (16 pages).

U.S. Non-Final Office Action issued in U.S. Appl. No. 19/041,960 dated Apr. 2, 2025 (20 pages).

U.S. Non-Final Office Action issued in U.S. Appl. No. 19/041,956 dated Apr. 3, 2025 (15 pages).

Strata Trust Company, "IRA Transfer Request: Precious Metal", Jul. 2017, https://www.stratatrust.com/content/uploads/2017/07/IRA-Transfer-Request_Precious-Metals.pdf (3 pages).

Mohanty, D., "Supply Chain-Gold Tokenization", In: R3 Corda for Architects and Developers, Apress, Berkeley, CA, 2019, https://doi.org/10.1007/978-1-4842-4529-3_ 11 pp. 193-198 (6 pages).

U.S. Non-Final Office Action issued in U.S. Appl. No. 19/205,326 dated Oct. 3, 2025 (20 pages).

* cited by examiner

1400

SECURE ENVIRONMENT REGISTER SYSTEM AND METHOD OF OPERATION

CROSS-REFERENCE TO RELATED APPLICATIONS

This application claims the priority benefit of U.S. patent application Ser. No. 18/581,345, filed on Feb. 19, 2024, and issued on Dec. 10, 2024 as U.S. Pat. No. 12,164,626, which claims the priority benefit of U.S. patent application Ser. No. 18/376,776, filed on Oct. 4, 2023, the contents of which are incorporated herein by reference in its entirety, which claims the priority benefit of U.S. patent application Ser. No. 17/986,037, filed on Nov. 14, 2022, and granted on Oct. 24, 2023 as U.S. Pat. No. 11,797,666, the contents of which are incorporated herein by reference, in its entirety, which claims the priority benefit of U.S. Provisional Patent Application No. 63/282,012, filed on Nov. 22, 2021, the contents of which are incorporated herein by reference, in its entirety.

A system and method of operation for a physically secure environment configured to receive precious metal thereto, to retain precious metal therein, and release precious metal therefrom. The system may include a registration system configured to record and maintain records containing precious metal information and may be configured to allocate a portion of a total quantity of certified standardized uniform characteristic (SUC) of a precious metal unit in a first location within the physically secure environment to be associated with a first lot. The system may then create a private registry with corresponding records associated with the allocated portion of certified SUC precious metal units in the first location.

BACKGROUND

Field of the Invention

This invention relates to the general field of storage, verifying of quality, diversion of storage locations and trading of physical precious metal with institutions, precious metal handlers, and individuals.

Description of the Related Art

For thousands of years, gold and other precious metals, such as silver, have been a key storage for wealth, currency and a safe haven during crisis. Precious metals have also been a traditional hedge against inflation. The current state of the art for ownership of precious metals is typically a precious metal fund that holds physical precious metals, for example, shares in an Electronically Trades Fund (ETF) "GLD" or owning physical precious metals. There are several options in owning physical precious metals. The first option is to buy and hold physical precious metals at home or in a safe location that you control. The more common approach is to own precious metals as part of a bank's physical holding. Withdrawing precious metals out of a bank is relatively complex because many investors want to store their precious metals in other countries such as Switzerland, Singapore, or United States. When precious metals are held offshore, there are significant problems getting access and transporting when an owner wants to withdraw the precious metal. Personal use of precious metals is also a significant problem. If someone is selling you an ounce of a precious metal, how do you know if it is real precious metal or the amount they claim? How do you know the purity of precious metal? Person-to-person transfer of precious metals is risky as is transporting of precious metals. Security and storage of precious metals is risky. Person-to-intuition transfer of precious metals, and the reverse, is also risky. Many of the current physical precious metals storage facilities state that you have a piece of a large precious metal block. This approach has the risk of the facility selling more pieces of precious metal than they physically have on hand. This can lead to a significant shortage should owners wish to withdraw their amount of precious metal. The prior art has not solved these problems in any way that the common man can avoid the significant risks of owning and trading physical precious metals. Transferring precious metals from one country to another involves a lot of local and international rules and regulations.

From all of the above, there exists a need for a system that overcomes the above-described problems associated with the current state of the art.

BRIEF SUMMARY

It should be appreciated that this Summary is provided to introduce a selection of concepts in a simplified form that are further described below in the Detailed Description. This Summary is not intended to be used to limit the scope of the claimed subject matter.

In some aspects, the techniques described herein relate to a physically secure environment system including: a physically secure environment configured to receive precious metal thereto, to retain precious metal therein, and release precious metal therefrom; a registration system configured to record and maintain records containing unique precious metal identification information, physically secure location information of precious metal, lot identification information of precious metal, and one of certification information or de-processing information of precious metal; wherein the physically secure environment system being configured to receive precious metal thereto by inspecting the precious metal to determine a mass value and a purity value of the precious metal, and certifying the precious metal based on one of a plurality of predetermined mass values, and one of a plurality of predetermined purity values thereby constituting a unit of certified standard uniform characteristic (SUC) precious metal; wherein the physically secure environment system being further configured to retain precious metal therein by allocating a portion of a total quantity of certified SUC precious metal units in a first location within the physically secure environment to be associated with a first lot and creating a first private registry with corresponding records associated with the allocated portion of certified SUC precious metal units in the first location, authorizing at least one administrative privilege for the allocated SUC precious metal units of the first lot for a trusted partner outside of the physically secure environment; wherein the physically secure environment system being further configured to release precious metal therein by removing an indicia from one of the certified SUC precious metal unit or the container containing the certified SUC precious metal unit, removing the location information from the corresponding record in the registration system, and inserting de-processing information into the corresponding record in the registration system.

In some aspects, the techniques described herein relate to a physically secure environment system including: a physically secure environment configured to receive precious metal thereto, to retain precious metal therein, and release precious metal therefrom; and a registration system configured to record and maintain records containing precious metal identification, location, lot and certification information; wherein the physically secure environment system being configured to receive precious metal thereto by certifying the received precious metal based on one of a plurality of predetermined mass values, and one of a plurality of predetermined purity values thereby constituting a unit of certified standard uniform characteristic (SUC) precious metal; wherein the physically secure environment system being further configured to retain precious metal therein by allocating a portion of a total quantity of certified SUC precious metal units in a first location within the physically secure environment to be associated with a first lot and creating a first private registry with corresponding records associated with the allocated portion of certified SUC precious metal units in the first location, and authorizing at least one administrative privilege for the allocated SUC precious metal units of the first lot for a trusted partner outside of the physically secure environment; wherein the physically secure environment system being further configured to release precious metal therein by removing the location information from a corresponding record in the registration system, and inserting de-processing information into the corresponding record in the registration system.

In some aspects, the techniques described herein relate to a method of allocating a portion of a total quantity of certified SUC precious metal units held within a physically secure environment system, the method including: providing a physically secure environment configured to receive precious metal thereto, to retain precious metal therein, and release precious metal therefrom; and providing a registration system configured to record and maintain records containing precious metal identification, location, lot and certification information; certifying the precious metal based on one of a plurality of predetermined mass values, and one of a plurality of predetermined purity values thereby constituting a unit of certified standard uniform characteristic (SUC) precious metal; allocating, by the physically secure environment system, at least a portion of a total quantity of certified SUC precious metal units in a first location within the physically secure environment to be associated with a first lot, and creating a private registry with corresponding records associated with the allocated portion of certified SUC precious metal units in the first location; authorizing at least one administrative privilege for the allocated SUC precious metal units of the first lot for a trusted partner outside of the physically secure environment; providing, to the trusted partner, access to the private registry to manage the allocated SUC precious metal units of the first lot; and de-processing, in response to a request, precious metal from the physically secure environment by removing the location information from a corresponding record in the registration system, and inserting de-processing information into the corresponding record in the registration system.

BRIEF DESCRIPTION OF THE SEVERAL VIEWS OF THE DRAWINGS

The aspects of the system will be better understood from the following detailed description with reference to the drawings, which are not necessarily drawing to scale and in which.

DETAILED DESCRIPTION

Figure 1:
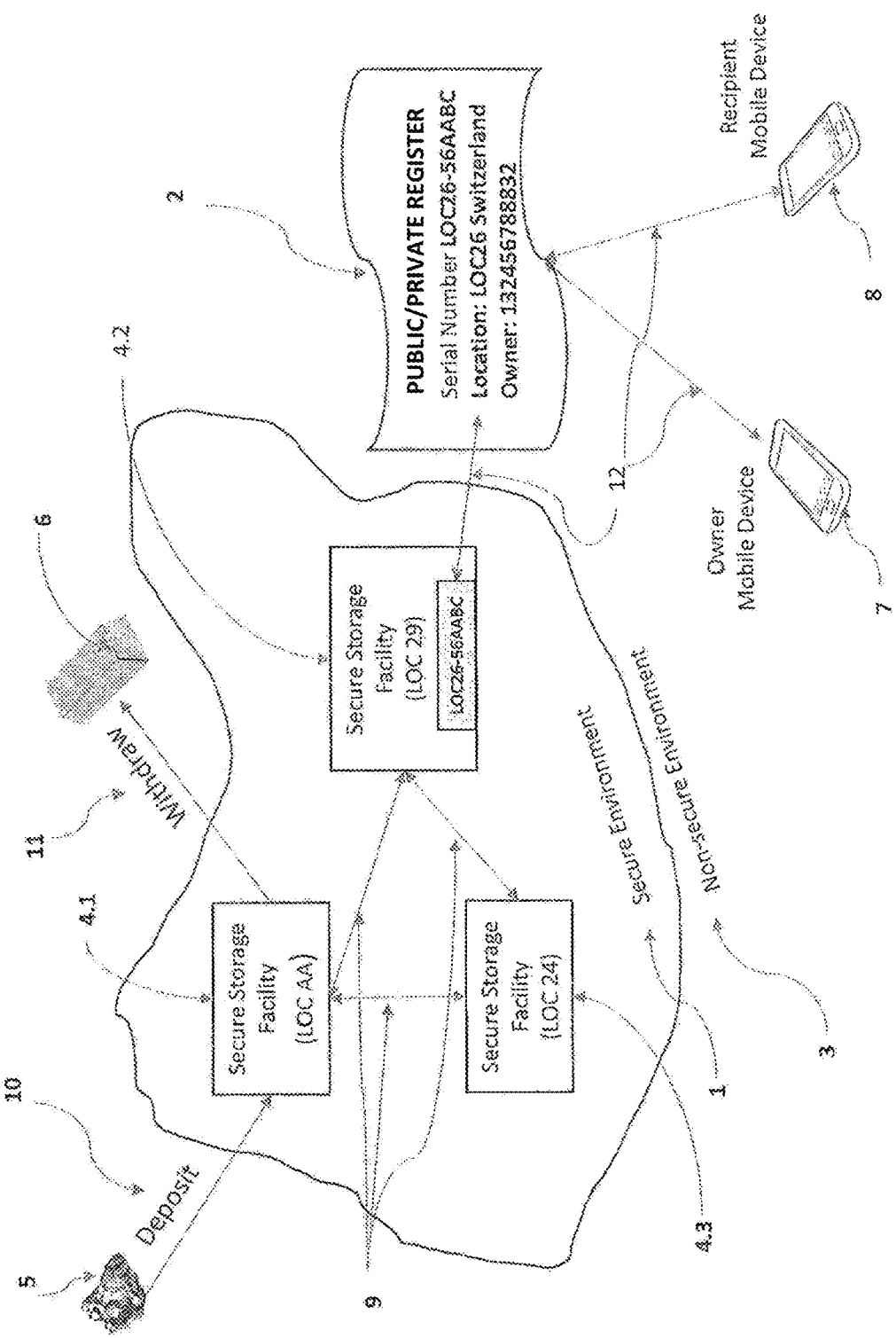
FIG. 1 illustrates the primary components of the Secure Environment Register system and method.

To overcome the problems associated with the current state of the art, and to provide a safe, secure method of trading precious metals, for example, gold, silver, platinum, etc., a system and method are provided which provide quality verification, storage, and transactions in a secure environment and meeting government laws and regulations using a blockchain public register or a private register, allowing individuals and institutions a novel method for use of physical precious metals.

The Secure Environment Public or Private Register (SEPR) is a method and system that allows precious metals bar or units to be certified, defined by various physical and purity standards, specially numbered to provide exact linkage to an owner, allow secure movement of precious metals between secure facilities, locations, countries, and through blockchain or private registers, allow secure transfer of ownership between individuals, organizations, international institutions, and countries. The SEPR allows precious metals to be easily in commerce with all the advantages of holding precious metals. The SEPR system will also allow exact audits of the metal bars on hand and avoid over-selling units since each bar is serialized and ownership is documented in a public or private register.

The primary embodiment of the SEPR system is built on one or more secure storage facilities connected with secure transfer transportation equipment that verifies shipping and receipt of precious metals between secure facilities, different locations, countries, or with the metal owners. SEPR is further defined and encompasses the use of public and/or private registers. The secure environment has controlled entry and exit points for accepting metals, analyzing metals, refining metals to achieve the proper quality, forming metals to a designated weight, engraving, packaging, serial numbering, each metal bar, then entering each serial-numbered metal bar into a register. Each secure facility has exact accountability of the metal bars it holds.

The register can be a public register such as blockchain register, Non-Fungible Token (NFT) or any other public register system. The register may also be a private register such as market maker's registers, brokerage firms, commodities firms, or organizations that allow internal trading among members. The public and private register systems can be delegated to sub-tier or third-party organizations. The public and private register systems confirms to the owner assurances of quality, quantity, location, and security whereby the system allows for secure transfer of metals between secure storage facilities either physically or virtually, and to and from individuals and between individuals. The serial number can be on the bar or the packaging, or both.

The secure environment has one or more said secure facilities, secure entry and exit points. The entry points are configured to receive, inspect, process, and verify quality of metals entering the secure environment. The entry points have instruments to measure the weight and quality of metal they are receiving in the secure facility. The secure facility has machines that processes metals entering the secure facility and can form metal bars or units to specific quality and weight specified into one or more various bars or units. The entry point has equipment for engraving or labeling metal bars or units with a unique identification number. The secure facility has a register and generates records for each precious metal bar or unit to include physical location and assigned owner. Each secure storage facility has a secure structure sufficient for storage of metal bars or units, a secure access protocol to maintain security and accountability of metal bars or units.

The secure environment has a secure transportation system which allows secure transfer of precious metals bars or units between secure facilities.

The secure environment has a secure ownership accountability system, such as a blockchain register system to document ownership, transactions, and physical location of each metal bar or unit.

The precious metal bar's or unit's location is important since investors may want to locate different quantities of bars or units in different countries. A key factor in owning physical precious metal is deciding which countries you want to locate the physical precious metal. International uncertainty and crises play a major part in diversification and confidence levels where to store precious metals. The SEPR system allows storage and transferring of metal bars or units between countries seamlessly and documented in a public or private register. The SEPR system would take into consideration international laws, storage requirements, and banking protocols.

One aspect of the SEPR system uses gold, silver, platinum and other precious metals. An alternate aspect of the SEPR method and system uses other metals such as palladium, copper, or rare earth minerals.

With the invention of blockchain, Public Key Infrastructure (PKI), internet connectivity, Non-Fungible Tokens, a revolutionary approach has been developed with a configuration of our invention that solves current problems with owning, securing, storing, trading, and transferring precious metals.

FIG. 1 illustrates one aspect of the SEPR system where a secure environment 1 is established comprising secure storage facilities 4, 4.1, 4.2, and . . . 4.n. Secure storage facilities 4, 4.1, 4.2 . . . 4.n may transfer precious metals bars or units virtually or physically through secure links 9, within the secure environment 1. The secure environment 1 differs from a non-secure environment 3 in such a manner that the metal bars or units remain in a secure environment and are not stored with the owner. The owner may withdraw 11 bars or units 6 from the secure environment, but the bars or units are no longer considered part of the secure system. Should an owner want to deposit 10 bars or units of precious metal 5 back into the secure environment, the bars or units have to go through a secure storage facility 4.1 where bars or units are created or recertified. This unique feature of an embodiment of this invention provides assurance that all bars or units within the secure environment are certified and accounted for, at each location. This provides confidence among individuals and organizations that trade metal bars or units.

The facilities within the secure environment 1 communicate with a public or private register 2 documenting all transactions, locations, and quantities of metal bars or units. Metal bar or unit owners communicate through a wide area network, e.g., the internet 12 on mobile devices 7 in order to conduct transactions to recipients through the internet 12 and mobile device 8. Raw and bar metal deposits 5 are made in a secure facility for processing 10. Withdrawals 11 can be made by owners requesting their bar 6 or bars.

Figure 2:
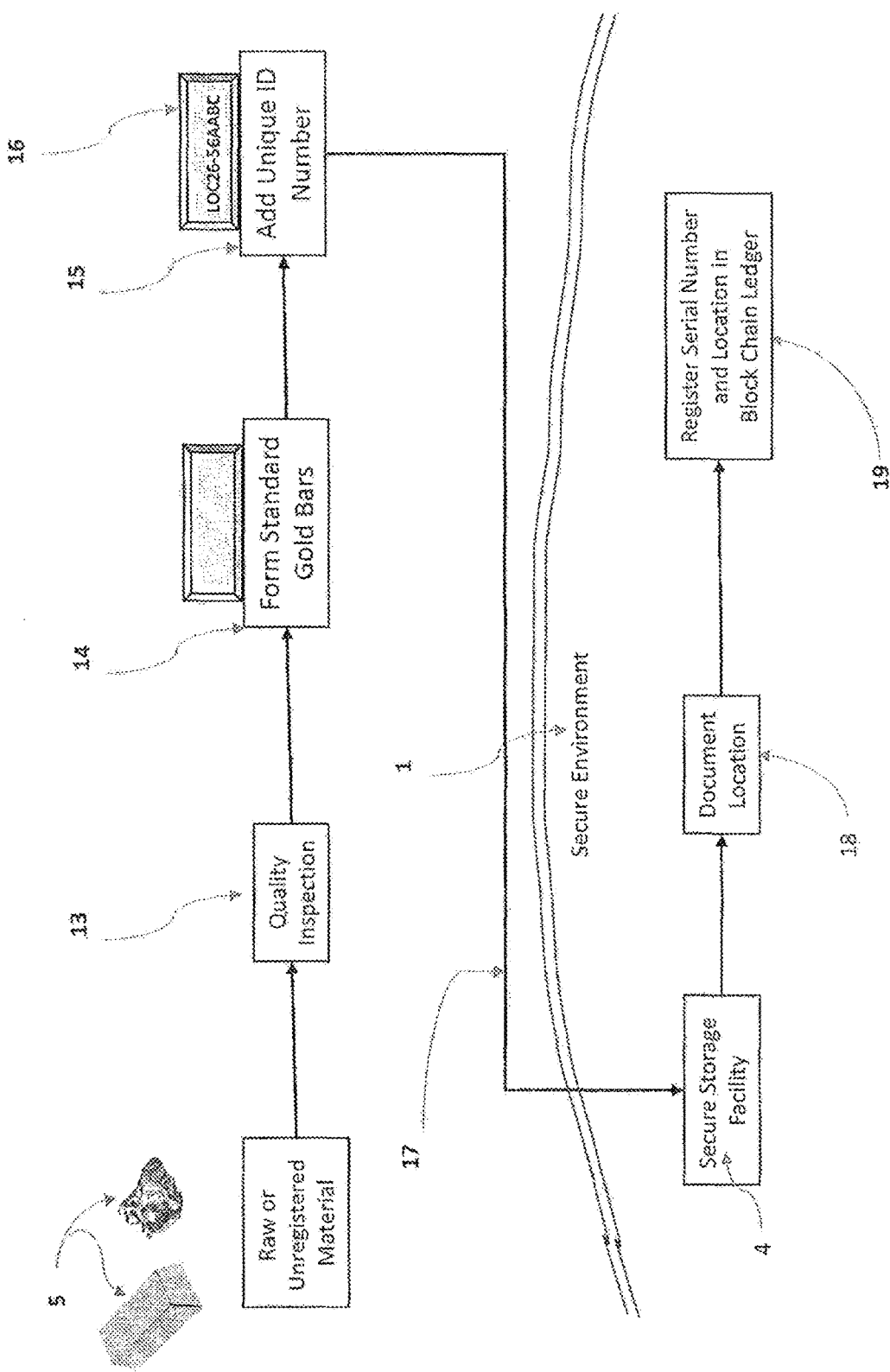
FIG. 2 illustrates a process for raw or unregistered precious metals entering the secure environment and secure storage facility.

FIG. 2 illustrates the detailed process of entering raw or unregistered material 5 into a secure environment. The raw unregistered material 5 is inspected 13 for material quality, fineness, and composition. The material is processed to form standard metal bars or units of specific uniform characteristics that will allow for trade. Unique ID numbers 15 and identification information are added to each of the metal bars or units in order to create a unique metal bar or unit 16. Once the unique metal bars or units 16 are created, they are officially entered 17 into the secure environment 1 at a secure facility 4. The secure facility 4 adds location information 18 for each metal bar or unit and enters the data 19 into the public/private register 2.

Figure 3:
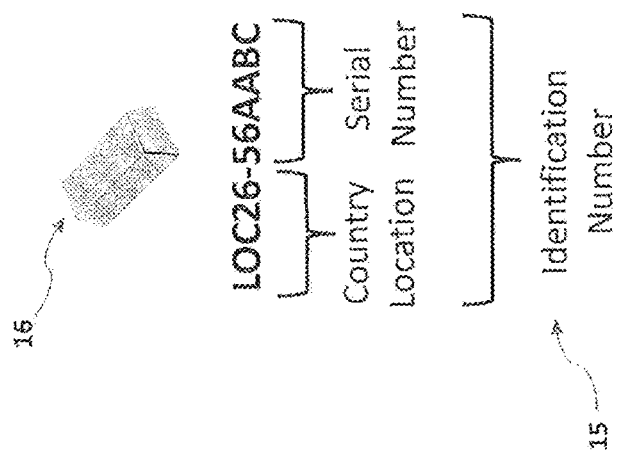
FIG. 3 illustrates a construction of an identification number.

FIG. 3 illustrates how a metal bar or unit 16 is tracked and identified by a combination of country, location, and secure storage facility location 15. An alternate embodiment for tracking can be utilizing the same identification number 15 and tracking location in the public/private register 2.

Figure 4:
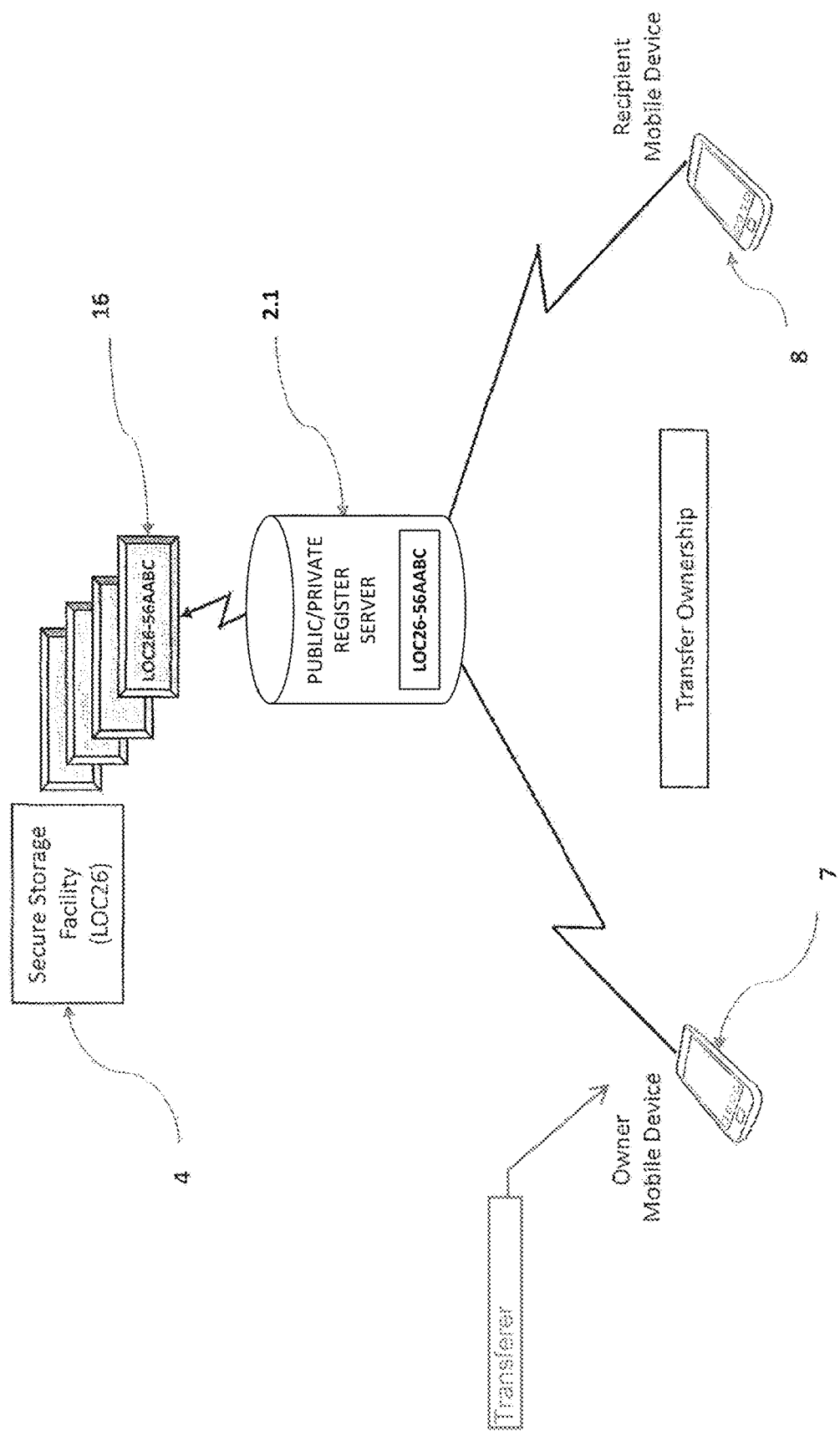
FIG. 4 illustrates transfer of a metal bar ownership between two mobile devices.

FIG. 4 illustrates the transfer of ownership from a mobile device 7 to a recipient's device 8 documented on the public/private register 2, (see FIG. 1), stored within a public/private register server 2.1. The owner certifies his ownership of a precious metal bar or unit 16 located at secure storage facility 4, as proof of ownership and availability for transfer of the precious metal bar or unit or other metal bar. This transfer is done in accordance with standard blockchain, NFT, Internet business processes such as EIP-721. EIP-721 is the standard industry process. These transactions could also be represented by NFTs, using the standard practice described in EIP-721. As an alternative, a separate, privately controlled entity could be specifically set up for brokering the transactions between individuals, organizations and corporations.

Figure 5:
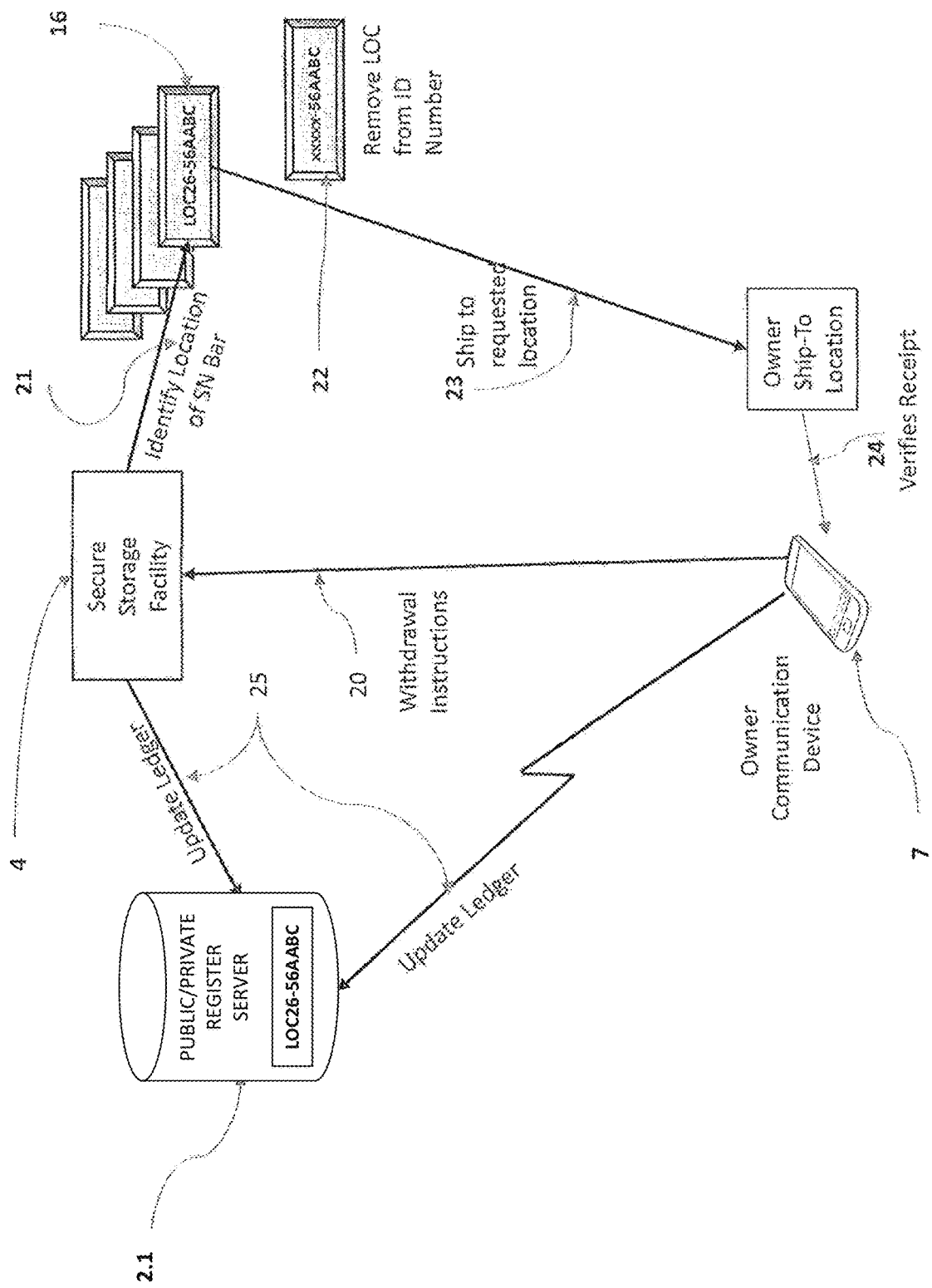
FIG. 5 illustrates the process to withdraw a metal bar from the secure environment.

FIG. 5 illustrates the process for an owner requesting to receive their metal bar or unit 16. The owner's communication device 7 communicates to the secure storage facility 4 a request for his documented precious metals bar(s) or unit 16. The secure storage facility 4 then identifies the location 21 of the precious metals bar or unit 16. The secure storage facility 4, along with the owner's communication device 7 would update 25 the public/private register 2, (see FIG. 1), in the public/private register server 2.1. The secure storage facility 4 would then de-process the precious metal bar or unit 16 by removing specific location information 22 and shipping the de-processed precious metal bar or unit 22 to the owner's requested location 23. The owner then verifies receipt 24.

Figure 6:
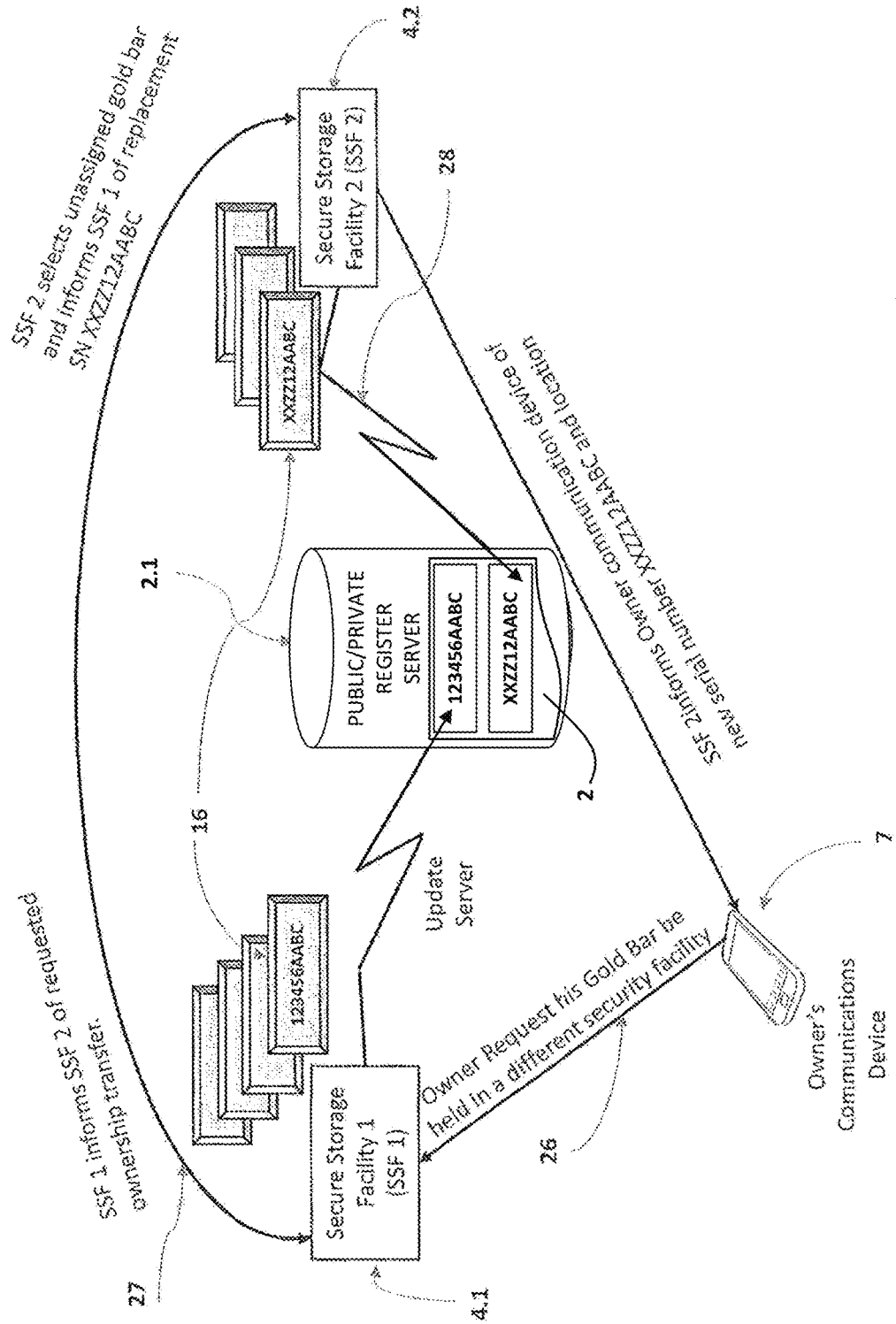
FIG. 6 illustrates the process to transfer ownership virtually to a new location within the secure environment.
Figure 7:
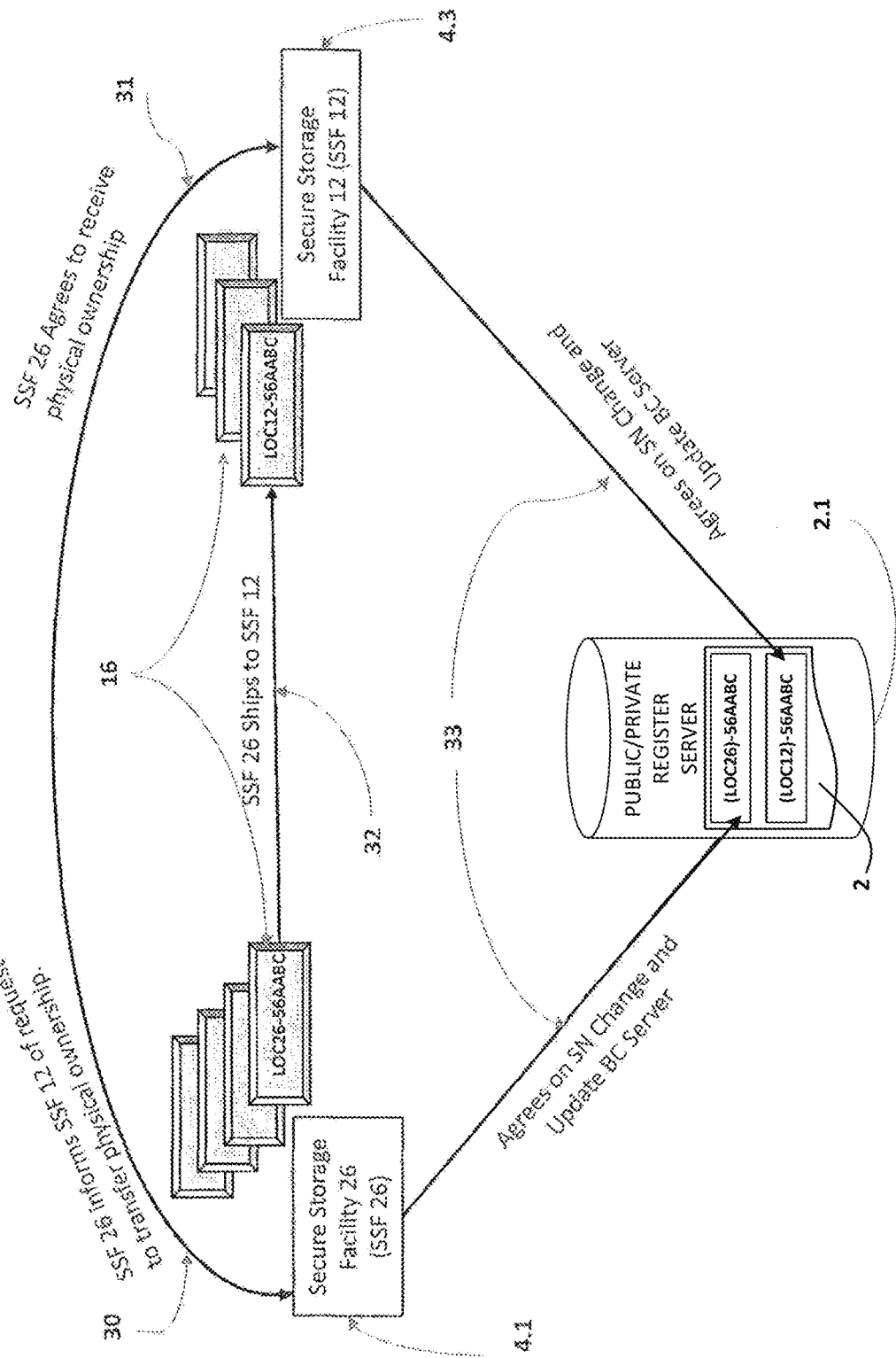
FIG. 7 illustrates the process to physically transfer ownership to a new location within the secure environment.

FIG. 6 illustrates an owner's request to virtually transfer metal bars or units to a new location. Owner's communication device 7 then sends a request 26 to secure storage facility 4.1 where the owner's metal bar or unit 16 currently resides, in order to transfer the metal bar or unit 16 to a specific new storage facility 4.2 in a different location or country. Secure storage facility 4.1 requests a virtual transfer 27 to transfer an equivalent metal bar or unit 16. Secure storage facility 4.2 selects unassigned metal bars or units and informs secure storage facility 4.1 of replacement identification number. Secure facility 4.2 and secure facility 4.1 both update the public/private register 2, stored within the public/private register server 2.1, of the change of ownership of metal bar or unit 16 through the equivalent bar or unit with different location and serial number. Secure facility 4.2 informs owner's communication device 7 of the new serial number and location as documented in the public/public register 2. FIG. 7 illustrates physical transfer of ownership between secure storage facilities. Secure storage facility 4.1 informs 30 secure storage facility 4.3 of a request to send or receive physical bars or units. Secure storage facility 4.3 agrees 31 to the shipping or receiving of physical bars. Secure storage facility 4.1 ships or receives the metal bar or unit 16 to secure storage facility 4.2. The public/private register 2 stored in the public/private register server 2.1 is updated 33 by both secure storage facilities 4.1, 4.2.

Figure 8:
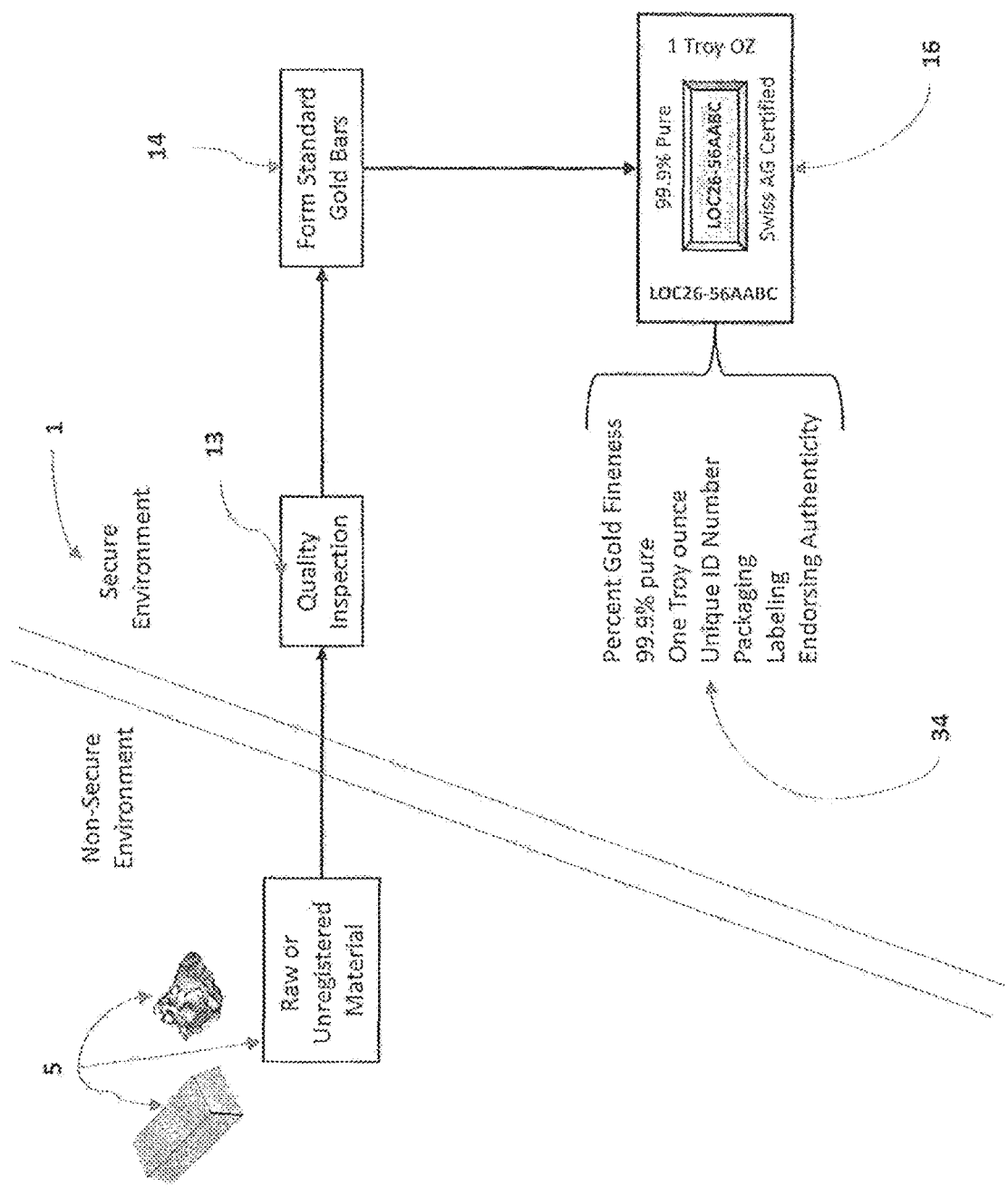
FIG. 8 illustrates several quality requirements for metals outside the secure environment to be performed in order to convert to standard metal bars for trading inside the secure environment.

FIG. 8 illustrates depositing raw or unregistered material 5 from a non-secure environment 3 into a secure environment 1. The raw or unregistered material 5 goes through quality inspections 13 and metal bars or units are formed 14. These metal bars or units 14 meet requirement standards 34 and once properly labeled, they become certified metal bars or units 16.

Figure 9:
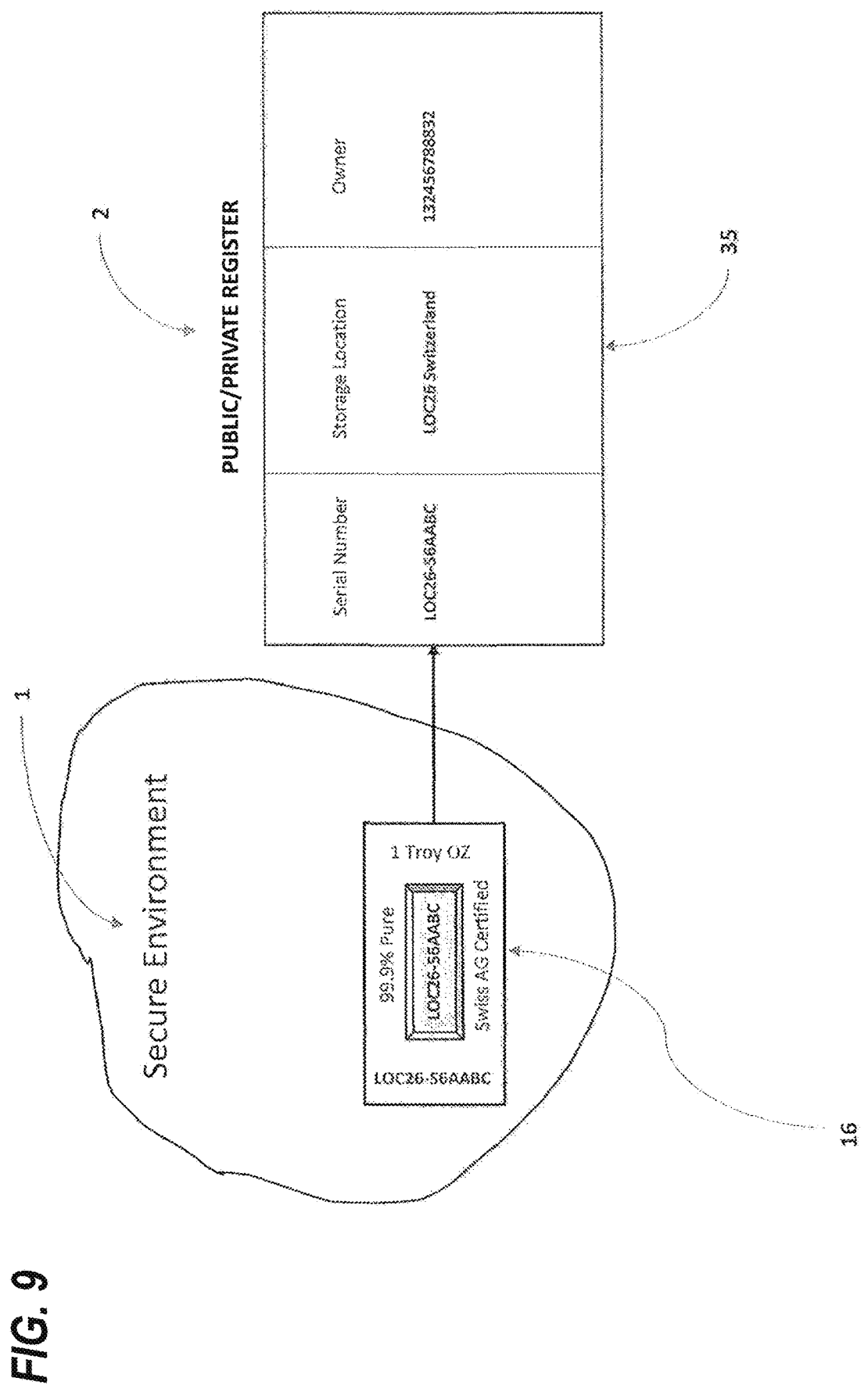
FIG. 9 illustrates several data requirements that are on each metal bar and information that would be in the public ledger or blockchain ledger.

FIG. 9 illustrates certified metal bars or units 16 in a secure environment 1 providing to the public/private register 2 specific identification, storage and owner record information 35.

Figure 10:
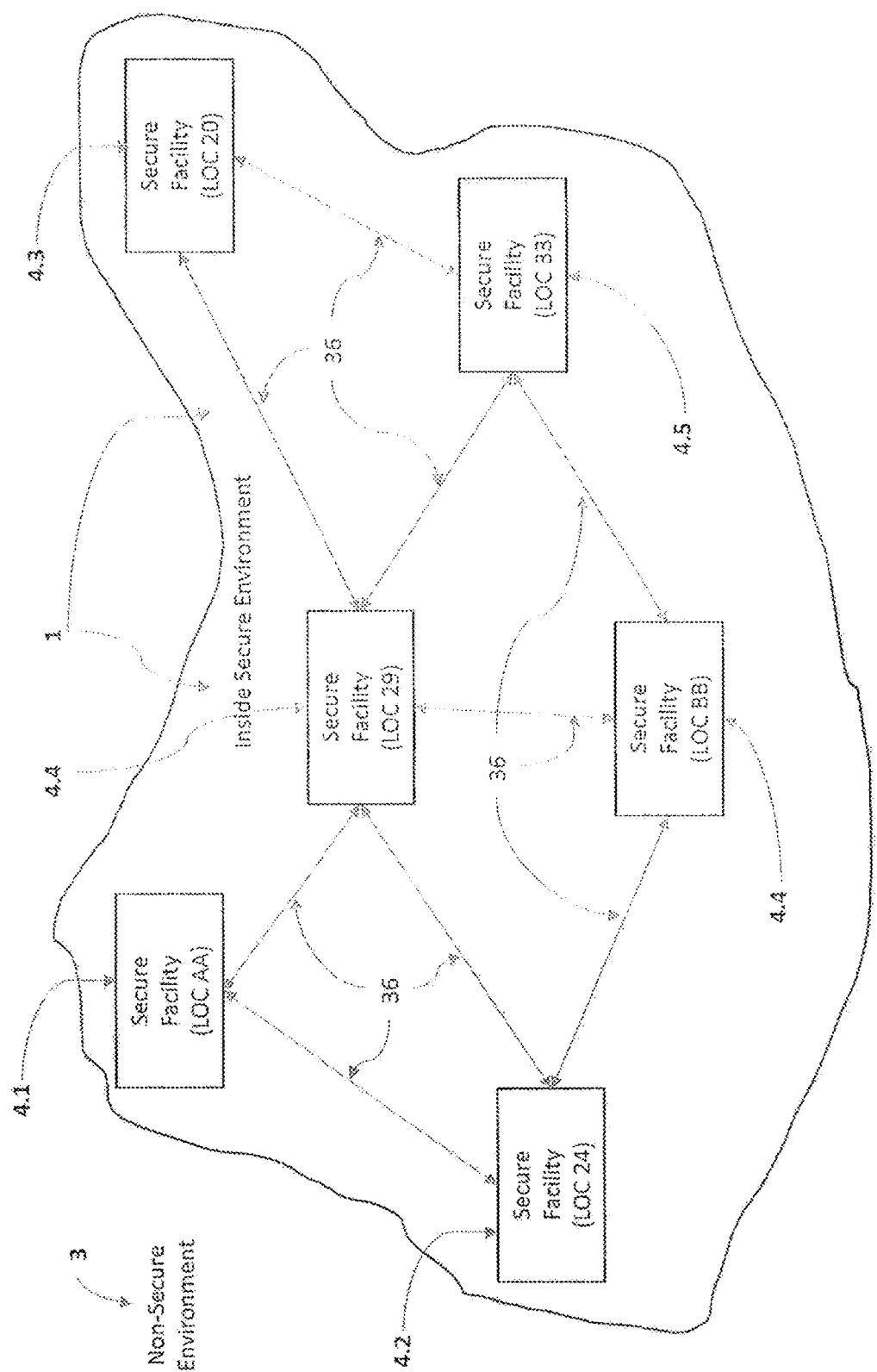
FIG. 10 illustrates normal transactions of metals and/or metal bars transitioning throughout the secure environment.

FIG. 10 illustrates virtual and physical transactions 36 between secure storage facilities 4.1, 4.2, 4.3, 4.4, and 4.5 inside a secure environment 1.

Figure 11:
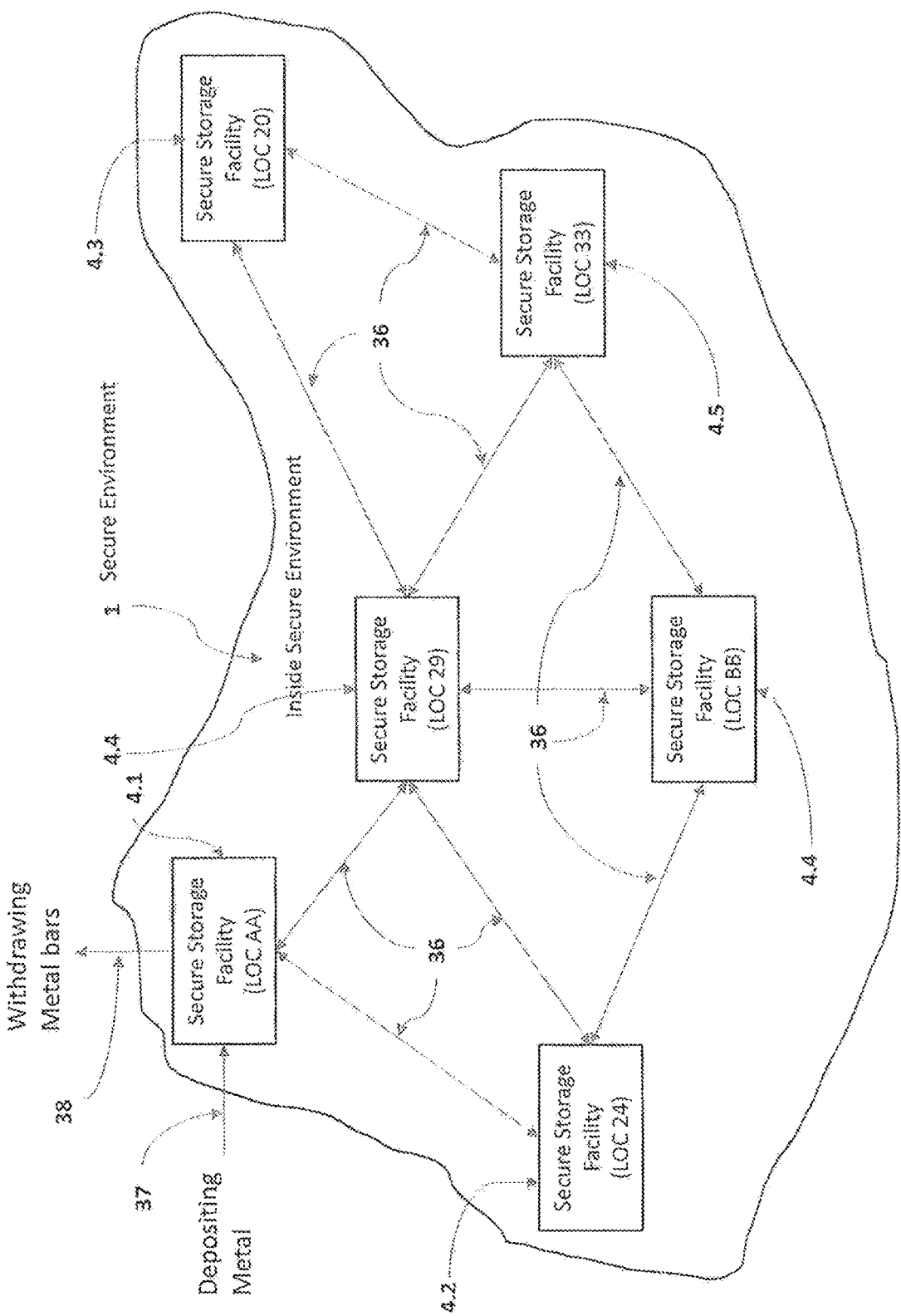
FIG. 11 illustrates normal transaction of metals and/or metal bars being deposited into the secure environment, moving around within the secure environment, and withdrawn from the secure environment.

FIG. 11 illustrates depositing metals 37 from a non-secure environment 3 to a secure storage facility 4.1, for processing. Once the deposited precious metal is processed and in the form of certified metal bars or units, the metal bar(s) or unit(s) can transfer either virtually or physically 36 between secure storage facilities 4.2, 4.3, 4.4, and 4.5. Certified precious metal bars or units can be withdrawn 38 from the secure environment 1 to the non-secure environment 3.

Figure 12:
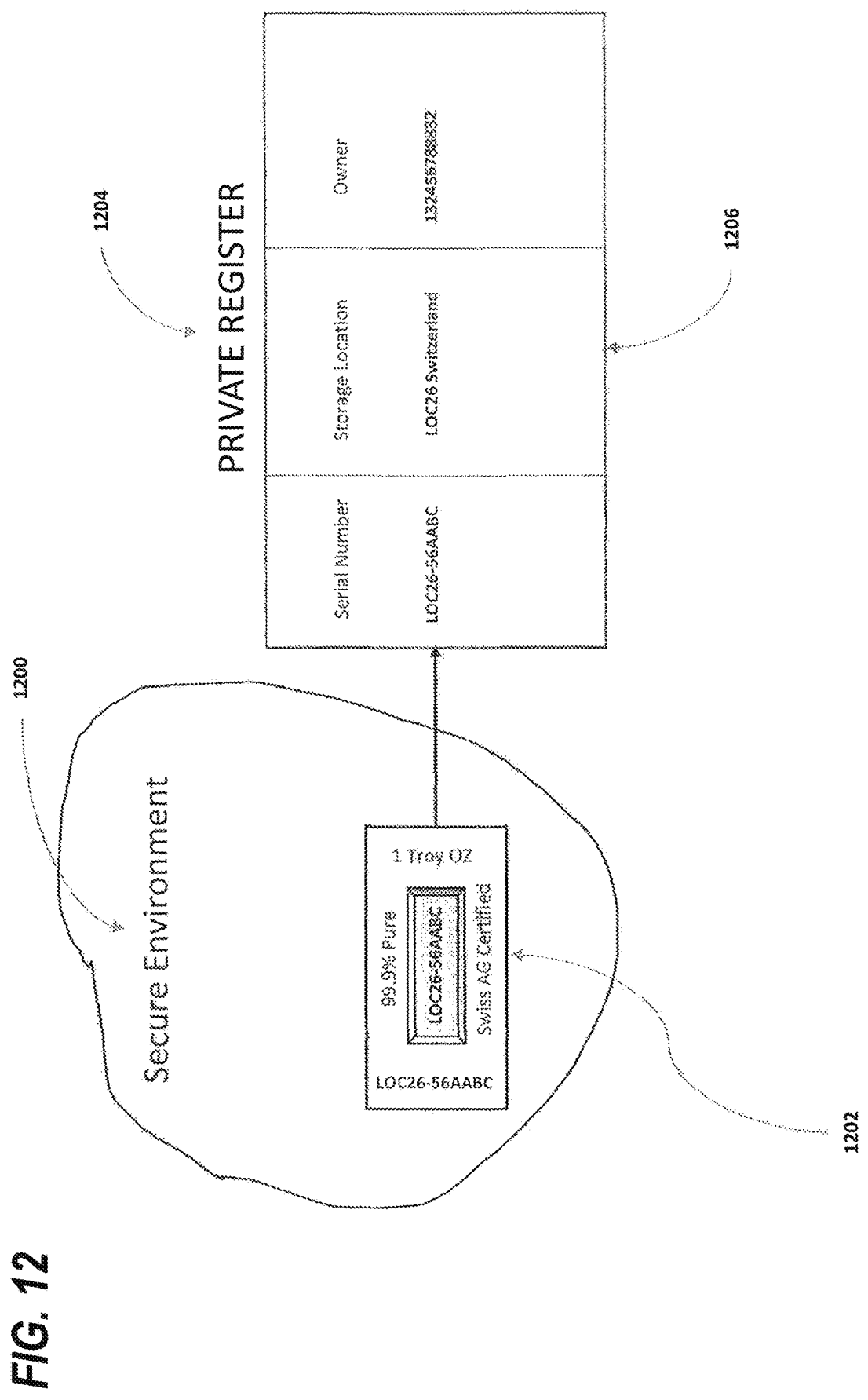
FIG. 12 illustrates a private register that documents the ownership of each precious metal bar.

FIG. 12 illustrates a private register 1204 that documents the ownership of each precious metal bar or unit 1202 within a Secure Environment 1200. In contrast, public/private register 2, as illustrated in FIG. 9, would be similar to a public Block Chain register or any register that is open to the public. A private register 1204 would be similar to an established commodities market or brokerage firm that controls and documents which of their client owns particular commodities or securities. The Secure Environment 1200 of FIG. 12 thus relies on a private register 1204 to record and determine ownership for each precious metal bar or unit 1202. A key configuration is that each precious metal bar unit 1202 has a unique owner where commodities are not in a single common ownership pool. An example private register record 1206 illustrates a serial number for a precious metal bar or unit, a storage location and an owner identifier number for each precious metal bar or unit.

Figure 13:
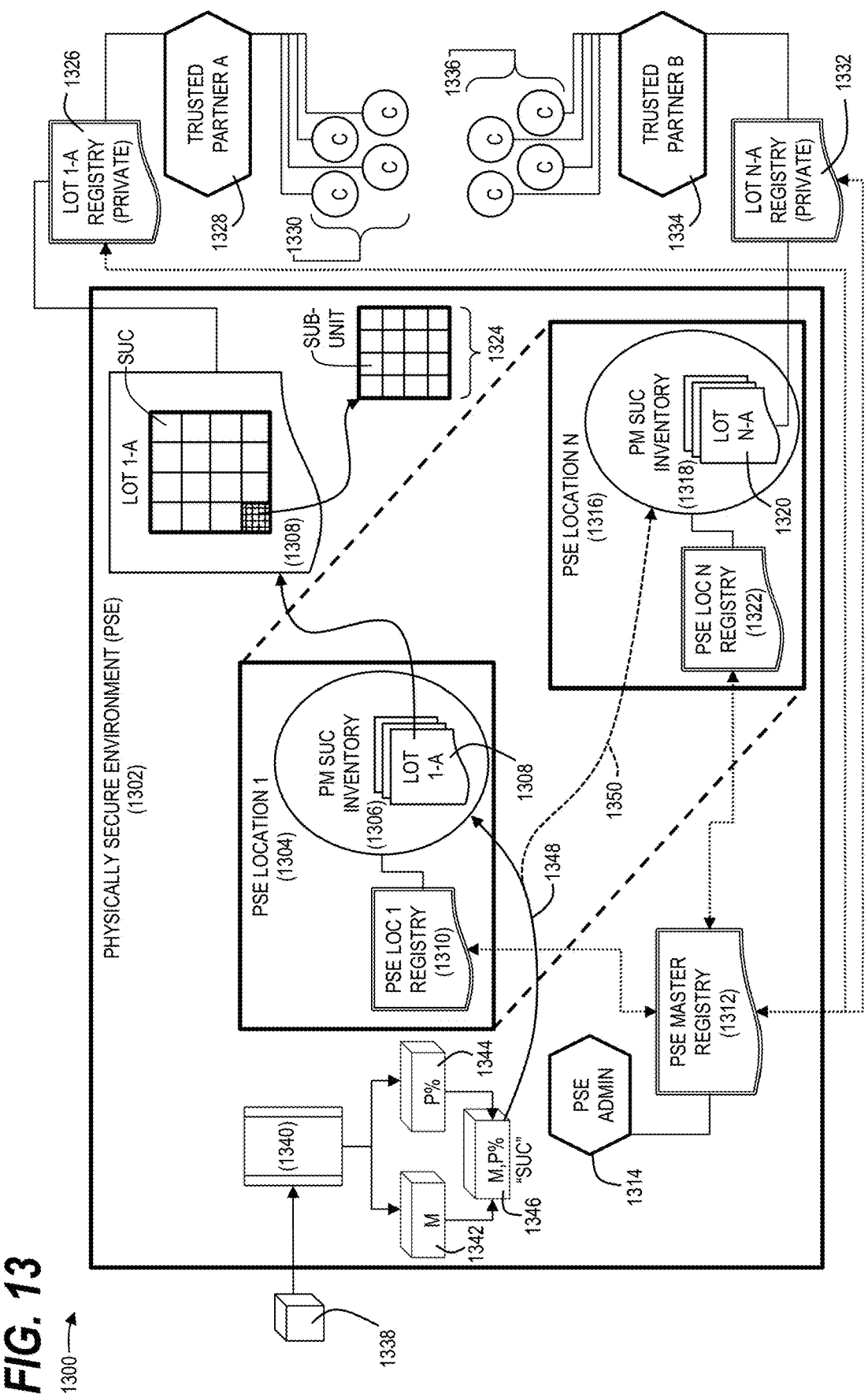
FIG. 13 illustrates physically secure environment system that includes designating lots of precious metal bars held in discrete locations that are authorized to be administered by trusted partners outside of the secure environment system.

FIG. 13 illustrates a secure environment registration system 1300 including a physically secure environment 1302 represented by a bold boundary box. As discussed above, the physically secure environment 1302 may be located over multiple physical locations, for example, a first location 1304 within the physically secure environment 1302 and a nth location 1316, (representing any number of a plurality of locations), within the physically secure environment 1302.

A representative first location 1304 may include a first location precious metal Standardized Uniform Characteristic (SUC) inventory 1306 that includes all the standardized uniform characteristic 1346 precious metal bars or units in that first location 1304. A first location registry 1310 may be managed by a local administrator 1314 of the physically secure environment 1302 to process and hold records of all the first location precious metal SUC inventory 1306 in the first location 1304.

The local administrator 1314 may further designate a particular number or series of standardized uniform characteristic 1346 bars or units within the first location precious metal SUC inventory 1306 as a first location first lot 1308, (in FIG. 13 illustrated as lot "1-A"). The local administrator 1314 may designate more than one lot per PSE location, (e.g., lots 1-B, 1-C, etc., for first location 1304, and lots N-B, N-C, etc., for nth location 1316), but each standardized uniform characteristic 1346 bar or unit at a PSE location may be only designated within a single unique lot.

An exemplary first location first lot 1308 may include a predetermined number of standardized uniform characteristic 1346 bars or units, (in FIG. 13 illustrated as a four-by-four matrix), wherein the local administrator 1314 may further designate at least one single standardized uniform characteristic 1346 bar or unit to be further subdivided into non-physically subdivided units 1324.

Both the first location first lot 1308 and the non-physically subdivided units 1324 within the first location first lot 1308 may be registered within a private first location lot registry 1326 authorized by the local administrator 1314 to be managed by a first trusted partner entity 1328. The first trusted partner entity 1328 may have the authority to conduct and manage transactions on standardized uniform characteristic 1346 bars or units within the first location first lot 1308 on behalf of first trusted partner clients 1330. The private first location lot registry 1326 of the first trusted partner entity 1328 may be responsible for operating the transaction and ownership records for the first lot 1308 and the non-physically subdivided units 1324. The physical precious metal bars or units would still remain in the physically secure environment 1302.

The private first location lot registry 1326 contains specific ownership information for every precious metal bar or unit in the authorized lot including serial numbers provided by the first location registry 1310 or the master registry 1312, wherein all precious metal bars or units are located in the physically secure environment 1302. This allows the establishment of a lot number, (for example, "1-A", in FIG. 13), in addition to the standardized serial numbering protocol of the local administrator 1314. The first lot 1308 may remain in one location, for example, first location precious metal SUC inventory 1306 in the physically secure environment 1302.

The secure environment registration system 1300, may allocate the portion of the total quantity of standardized uniform characteristic 1346 precious metal units by either setting a fixed quantity of certified SUC precious metal for the first lot, or by setting a dynamic rule-based quantity. For example, a dynamic rule-based quantity may set a maximum replenishment quantity of certified SUC precious metal for the first lot. This rule may anticipate that the lot be replenished to a maximum value if any certified SUC precious metal are removed from the physically secure environment 1302 by request of an owner.

The dynamic rule-based quantity may set a minimum quantity of certified SUC precious metal for the first lot, where a lot may be resupplied only when a quantity drops below a certain minimum quantity or limit. The dynamic rule-based quantity may set a predetermined incremental replenishment quantity of certified SUC precious metal for the first lot, where a rate of replenishment may be set over a unit of time.

The at least one administrative privilege for the allocated SUC precious metal units of the first (or any other) lot for the trusted partner may be based on a territorial law or regulation, for example, where client transactions within the allocated lot may be performed only within a determined territorial law or regulation that the clients are subject to.

The at least one administrative privilege for the allocated SUC precious metal units of the first lot for the trusted partner is based on a financial law or regulation, where client transactions within the allocated lot may be performed only within a determined scope of particular financial laws or regulations that the clients are subject to.

The at least one administrative privilege for the allocated SUC precious metal units of the first lot for the trusted partner is based on at least a client being either a government entity or a sovereign entity.

The at least one administrative privilege for the allocated SUC precious metal units of the first lot for the trusted partner is based on at least one of a geophysical region or geopolitical jurisdiction, where client transactions within the allocated lot may be performed only within a specific geophysical region or geopolitical jurisdiction that the clients are subject to or residing within.

The at least one administrative privilege for the allocated SUC precious metal units of the first lot for the trusted partner is based on client transactions within the allocated lot being conducting in a particular local, national or regional currency.

The at least one administrative privilege for the allocated SUC precious metal units of the first lot for the trusted partner is based on clients conducting transactions within the allocated lot on a particular e-commerce financial transaction platform.

The at least one administrative privilege for the allocated SUC precious metal units of the first lot for the trusted partner is based on clients conducting transactions within the allocated lot within a particular social media platform.

The at least one administrative privilege for the allocated SUC precious metal units of the first lot for the trusted partner is based on clients conducting transactions within the allocated lot through a banking or financial services provider or platform.

The at least one administrative privilege for the allocated SUC precious metal units of the first lot for the trusted partner is based on clients conducting transactions within the allocated lot through a brokerage institution or a trading company.

The at least one administrative privilege for the allocated SUC precious metal units of the first lot for the trusted partner is based on clients conducting transactions within the allocated lot via an Original Equipment Manufacturer (OEM) financing service or OEM payment platform. An example may be an OEM vehicle manufacturer that provides client transaction access to an allocated lot for the purpose of receiving payments and securing investing funding via the allocated SUC precious metal units.

The authorizing the at least one administrative privilege for the allocated SUC precious metal units of the first lot for the trusted partner outside of the physically secure environment further includes authorizing the trusted partner to manage purchasing, selling and assigning of ownership of allocated SUC precious metal units of the first lot of the trusted partner. For example, for a trusted partner that is a broker with clients, the broker will conduct transactions on behalf of client within the allocated SUC precious metal units of the lot. For a trust partner that is a governmental or sovereign entity, the entity may conduct transactions on behalf of its ministry of finance department or on behalf of its sovereign wealth fund management.

The authorizing the at least one administrative privilege for the allocated SUC precious metal units of the first lot for the trusted partner outside of the physically secure environment further includes authorizing the trusted partner to manage processing a request, (for example, by a client, or on directly on behalf of the trusted partner), for physical delivery of at least one allocated SUC precious metal unit of the first lot of the trusted partner.

The authorizing the at least one administrative privilege for the allocated SUC precious metal units of the first lot for the trusted partner outside of the physically secure environment further includes authorizing the trusted partner to manage subdivision of an interest of one allocated SUC precious metal unit of the first lot of the trusted partner and subsequent purchase, sale and assignment of ownership of at least one subdivided interest of the allocated SUC precious metal unit of the first lot. Therefore, the trusted partner, may further conduct transactions on behalf of, for example, clients, to purchase, sell and transfer ownership of the subdivided interests of the allocated SUC precious metal unit(s) of the lot. However, any owner of a subdivided interest of an allocated SUC precious metal unit of the lot may not request to take physical delivery of the subdivided unit, unless and the owner takes ownership of all the subdivided units of the lot to thereby control ownership of the original undivided SUC precious metal unit.

Likewise, a representative nth location 1316 with the physically secure environment 1302 may include an nth location precious metal Standardized Uniform Characteristic (SUC) inventory 1318 that includes all the standardized uniform characteristic 1346 precious metal bars or units in that nth location 1316. An nth location registry 1322 may be managed by a local administrator 1314 of the physically secure environment 1302 to process and hold records of all the nth location precious metal SUC inventory 1318 in the nth location 1316.

The local administrator 1314 may further designate a particular number or series of standardized uniform characteristic 1346 bars or units within the nth location precious metal SUC inventory 1318 as an nth location second lot 1320, (in FIG. 13 illustrated as lot "N-A"). The local administrator 1314 may designate more than one lot per PSE location, but each standardized uniform characteristic 1346 bar or unit may be only designated within a single unique lot.

An exemplary nth location second lot 1320 may include a predetermined number of standardized uniform characteristic 1346 bars or units, (for example, like first location first lot 1308), wherein the local administrator 1314 may further designate at least one single standardized uniform characteristic 1346 bar or unit to be further subdivided into non-physically subdivided units, (for example, like non-physically subdivided units 1324).

Both the nth location second lot 1320 and any non-physically subdivided units within the nth location second lot 1320 may be registered within a private nth location lot registry 1332 authorized by the local administrator 1314 to be managed by a second trusted partner entity 1334. The second trusted partner entity 1334 may have the authority to conduct and manage transactions on standardized uniform characteristic 1346 bars or units within nth location second lot 1320 on behalf of second trusted partner clients 1336. The second trusted partner entity 1334 may have any and all options for allocation of the second lot 1320 and management of the second lot 1320 as discussed above with respect to the first trusted partner entity's 1328 allocation and management of the first lot 1308.

In further detail per the above description, incoming precious metal material 1338 to the physically secure environment 1302 may be received at an inspection and processing system 1340. Incoming precious metal material 1338 may include, raw precious metal, precious metal bullion, precious metal coins, or de-processed SEPR SUC bars or units. The incoming precious metal material 1338 may be inspected for purity and mass (commonly, weight) properties, and may be further processed and/or refined based on its mass property, its purity property or both the mass and purity property, to create a standardized uniform characteristic 1346 (SUC) bar or unit of precious metal. Once the standardized uniform characteristic 1346 bar or unit of precious metal has been processed and/or refined within the physically secure environment 1302, the standardized uniform characteristic 1346 bar or unit may be transported within the physically secure environment 1302 to any location within the physically secure environment 1302, for example, the first location precious metal SUC inventory 1306 via an exemplary transfer 1348, or in the alternative, to the nth location precious metal SUC inventory 1318 via an alternative transfer 1350.

Certifying the received precious metal may further include processing the received precious metal into one of the plurality of predetermined mass values. For example, one of several predetermined mass units (commonly referred to as "weights"), may be selected for the incoming precious metal material 1338 to be processed into. For example, the system may process the incoming precious metal material 1338 into a 1-gram mass, a 1-kilogram mass, a 1-troy ounce mass, a 1-pound mass, or any predetermined subdivisions of the aforementioned masses.

Certifying the received precious metal further includes processing the received precious metal into one of the plurality of predetermined purity values. For example, one of several predetermined purity values may be selected for the incoming precious metal material 1338 to be processed into. For example, the system may process the incoming precious metal material 1338, if gold, into 999.9 (24 karat), 916 (22 karat), or 834 (20 karat) purities, if silver, into 999, 980, or 925 purities, if platinum, into 99.95, or 950 purities.

The physically secure environment system further includes registering the certified SUC precious metal unit by providing a registration indicia on one of the certified SUC precious metal unit or a container containing the certified SUC precious metal unit and creating and storing a record within the registration system, (master registry 1312, the first location registry 1310 or the nth location registry 1322), associated with the certified SUC precious metal unit.

In some aspects, the techniques described herein relate to a physically secure environment system including: a physically secure environment configured to receive precious metal thereto, to retain precious metal therein, and release precious metal therefrom; a registration system configured to record and maintain records containing unique precious metal identification information, physically secure location information of precious metal, lot identification information of precious metal, and one of certification information or de-processing information of precious metal; wherein the physically secure environment system being configured to receive precious metal thereto by inspecting the precious metal to determine a mass value and a purity value of the precious metal, and certifying the precious metal based on one of a plurality of predetermined mass values, and one of a plurality of predetermined purity values thereby constituting a unit of certified standard uniform characteristic (SUC) precious metal; wherein the physically secure environment system being further configured to retain precious metal therein by allocating a portion of a total quantity of certified SUC precious metal units in a first location within the physically secure environment to be associated with a first lot and creating a first private registry with corresponding records associated with the allocated portion of certified SUC precious metal units in the first location, authorizing at least one administrative privilege for the allocated SUC precious metal units of the first lot for a trusted partner outside of the physically secure environment; wherein the physically secure environment system being further configured to release precious metal therein by removing an indicia from one of the certified SUC precious metal unit or the container containing the certified SUC precious metal unit, removing the location information from the corresponding record in the registration system, and inserting de-processing information into the corresponding record in the registration system.

In some aspects, the techniques described herein relate to a physically secure environment system including: a physically secure environment configured to receive precious metal thereto, to retain precious metal therein, and release precious metal therefrom; and a registration system configured to record and maintain records containing precious metal identification, location, lot and certification information; wherein the physically secure environment system being configured to receive precious metal thereto by certifying the received precious metal based on one of a plurality of predetermined mass values, and one of a plurality of predetermined purity values thereby constituting a unit of certified standard uniform characteristic (SUC) precious metal; wherein the physically secure environment system being further configured to retain precious metal therein by allocating a portion of a total quantity of certified SUC precious metal units in a first location within the physically secure environment to be associated with a first lot and creating a first private registry with corresponding records associated with the allocated portion of certified SUC precious metal units in the first location, and authorizing at least one administrative privilege for the allocated SUC precious metal units of the first lot for a trusted partner outside of the physically secure environment; wherein the physically secure environment system being further configured to release precious metal therein by removing the location information from a corresponding record in the registration system, and inserting de-processing information into the corresponding record in the registration system.

Figure 14:
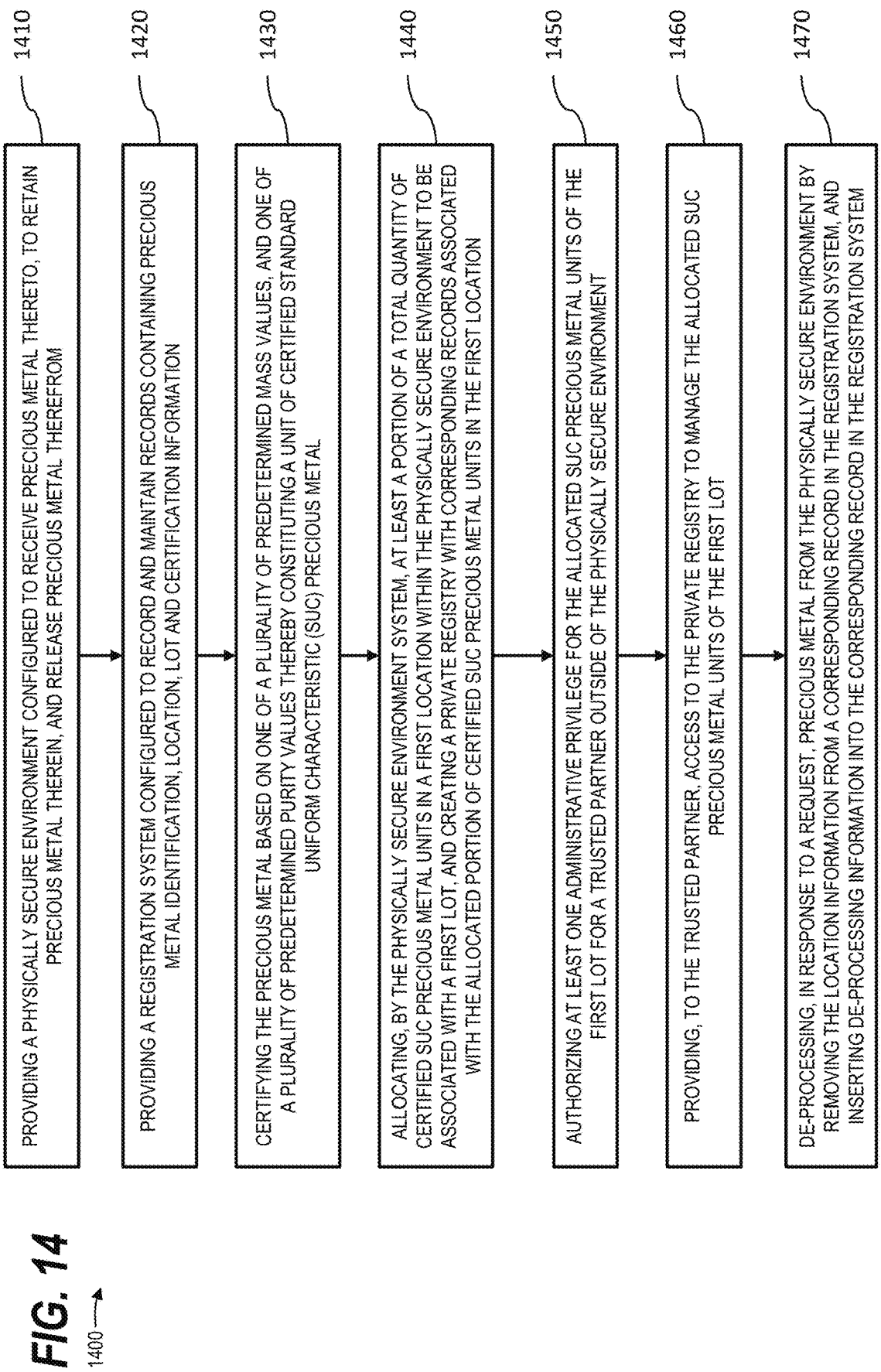
FIG. 14 illustrates method of operating the physically secure environment system.

FIG. 14 illustrates a logic flowchart of a method 1400 of operating the secure environment registration system 1300 of FIG. 13. The method 1400 allocates a portion of a total quantity of certified SUC precious metal units held within a physically secure environment system, and includes: providing 1410 a physically secure environment configured to receive precious metal thereto, to retain precious metal therein, and release precious metal therefrom; and providing 1420 a registration system configured to record and maintain records containing precious metal identification, location, lot and certification information; certifying 1430 the precious metal based on one of a plurality of predetermined mass values, and one of a plurality of predetermined purity values thereby constituting a unit of certified standard uniform characteristic (SUC) precious metal; allocating 1440, by the physically secure environment system, at least a portion of a total quantity of certified SUC precious metal units in a first location within the physically secure environment to be associated with a first lot, and creating a private registry with corresponding records associated with the allocated portion of certified SUC precious metal units in the first location; authorizing 1450 at least one administrative privilege for the allocated SUC precious metal units of the first lot for a trusted partner outside of the physically secure environment; providing 1460, to the trusted partner, access to the private registry to manage the allocated SUC precious metal units of the first lot; and de-processing 1470, in response to a request, precious metal from the physically secure environment by removing the location information from a corresponding record in the registration system, and inserting de-processing information into the corresponding record in the registration system.

Figure 15:
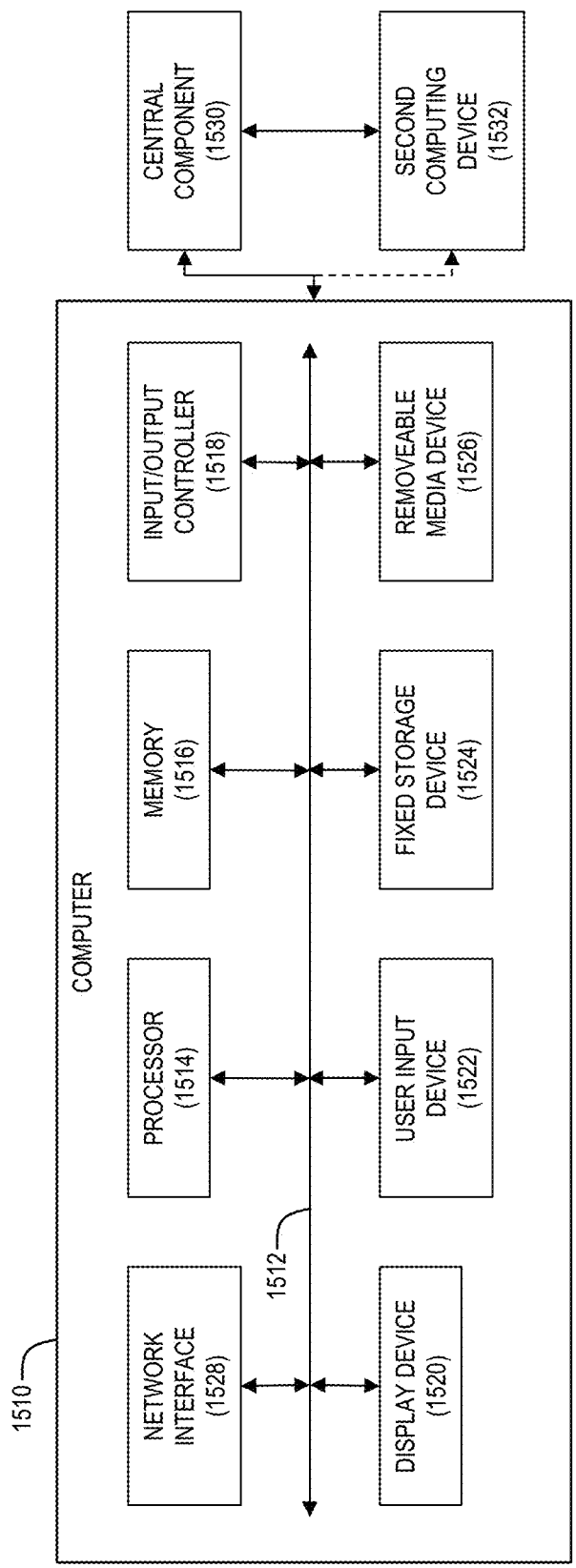
FIG. 15 illustrates a schematic diagram of an exemplary hardware environment that may be used to implement the aspects of the system as described in FIGS. 1-14.

With reference to FIG. 15 a schematic diagram of an exemplary hardware environment that can be used to implement the above-identified aspects.

Implementations of the presently disclosed subject matter may be implemented in and used with a variety of component and network architectures. FIG. 15 is an example computer environment 1500 and an example computer 1510 suitable for implementing implementations of the presently disclosed subject matter, and particularly the local administrator 1315 of FIG. 13.

As discussed in further detail herein, computer 1510 may be a single computer in a network of multiple computers. As shown in FIG. 15, computer 1510 may communicate with a central component 1530 (e.g., server, cloud server, database, etc.). The central component 1530 may communicate with one or more other computers such as the second computer 1532. According to this implementation, the information obtained to and/or from a central component 1530 may be isolated for each computer such that computer 1510 may not share information with second computer 1532. Alternatively, or in addition, computer 1510 may communicate directly with the second computer 1532.

The computer 1510, (e.g., user computer, enterprise computer, etc.), includes a bus 1512 which interconnects major components of the computer 1510, such as a central processor 1514, a memory 1516, (typically RAM, but which may also include ROM, flash RAM, or the like), an input/output controller 1518, a user display 1520, such as a display or touch screen via a display adapter, a user input interface 1522, which may include one or more controllers and associated user input or devices such as a keyboard, mouse, WIFI/cellular radios, touchscreen, microphone/speakers and the like, and may be closely coupled to the input/output controller 1518, fixed storage 1524, such as a hard drive, flash storage, Fiber Channel network, SAN device, SCSI device, and the like, and a removable media storage device 1526 operative to control and receive an optical disk, flash drive, and the like.

The bus 1512 enable data communication between the central processor 24 and the memory 1516, which may include read-only memory (ROM) or flash memory (neither shown), and random-access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 1510 can be stored on and accessed via a computer readable medium, such as a hard disk drive, (e.g., fixed storage 1524), an optical drive, floppy disk, or another removable media storage device 1526.

The fixed storage 1524 may be integrated with the computer 1510 or may be separate and accessed through other interfaces. A network interface 1528 may provide a direct connection to a remote server via a telephone link, to the Internet via an internet service provider (ISP), or a direct connection to a remote server via a direct network link to the Internet via a POP (point of presence) or other technique. The network interface 1528 may provide such connection using wireless techniques, including digital cellular telephone connection, Cellular Digital Packet Data (CDPD) connection, digital satellite data connection or the like. For example, the network interface 1528 may enable the computer to communicate with other computers via one or more local, wide-area, or other networks.

Many other devices or components (not shown) may be connected in a similar manner (e.g., document scanners, digital cameras and so on). Conversely, all of the components shown in FIG. 15 need not be present to practice the present disclosure. The components can be interconnected in different ways from that shown. The operation of a computer such as that shown in FIG. 15 is readily known in the art and is not discussed in detail in this application. Code to implement the present disclosure can be stored in computer-readable storage media such as one or more of the memory 1516, fixed storage 1524, removable media storage device 1526, or on a remote storage location.

Clause 1. A physically secure environment system comprising: a physically secure environment configured to receive precious metal thereto, to retain precious metal therein, and release precious metal therefrom; a registration system configured to record and maintain records containing unique precious metal identification information, physically secure location information of precious metal, lot identification information of precious metal, and one of certification information or de-processing information of precious metal; wherein the physically secure environment system being configured to receive precious metal thereto by inspecting the precious metal to determine a mass value and a purity value of the precious metal, and certifying the precious metal based on one of a plurality of predetermined mass values, and one of a plurality of predetermined purity values thereby constituting a unit of certified standard uniform characteristic (SUC) precious metal; wherein the physically secure environment system being further configured to retain precious metal therein by allocating a portion of a total quantity of certified SUC precious metal units in a first location within the physically secure environment to be associated with a first lot and creating a first private registry with corresponding records associated with the allocated portion of certified SUC precious metal units in the first location, authorizing at least one administrative privilege for the allocated SUC precious metal units of the first lot for a trusted partner outside of the physically secure environment; wherein the physically secure environment system being further configured to release precious metal therein by removing an indicia from one of the certified SUC precious metal unit or the container containing the certified SUC precious metal unit, removing the location information from the corresponding record in the registration system, and inserting de-processing information into the corresponding record in the registration system.

Clause 2. The physically secure environment system of clause 1, wherein the certifying the received precious metal further includes processing the received precious metal into one of the plurality of predetermined mass values.

Clause 3. The physically secure environment system of clause 1, wherein the certifying the received precious metal further includes processing the received precious metal into one of the plurality of predetermined purity values.

Clause 4. The physically secure environment system of clause 1, wherein receiving the precious metal into the physically secure environment system further includes registering the certified SUC precious metal unit by providing a registration indicia on one of the certified SUC precious metal unit or a container containing the certified SUC precious metal unit, and creating and storing a record within the registration system associated with the certified SUC precious metal unit.

Clause 5. The physically secure environment system of clause 1, wherein the allocating the portion of the total quantity of certified SUC precious metal includes one of: setting a fixed quantity of certified SUC precious metal for the first lot; setting a maximum replenishment quantity of certified SUC precious metal for the first lot; setting a minimum quantity of certified SUC precious metal for the first lot; and setting a predetermined incremental replenishment quantity of certified SUC precious metal for the first lot.

Clause 6. The physically secure environment system of clause 1, wherein the at least one administrative privilege for the allocated SUC precious metal units of the first lot for the trusted partner is based on a territorial law or regulation.

Clause 7. The physically secure environment system of clause 1, wherein the at least one administrative privilege for the allocated SUC precious metal units of the first lot for the trusted partner is based on a financial law or regulation.

Clause 8. The physically secure environment system of clause 1, wherein the at least one administrative privilege for the allocated SUC precious metal units of the first lot for the trusted partner is based on at least one of government entity or sovereign entity.

Clause 9. The physically secure environment system of clause 1, wherein the at least one administrative privilege for the allocated SUC precious metal units of the first lot for the trusted partner is based on at least one of a geophysical location or geopolitical jurisdiction. Clause 10. The physically secure environment system of clause 1, wherein the at least one administrative privilege for the allocated SUC precious metal units of the first lot for the trusted partner is based on at least one of a local, national or regional currency.

Clause 11. The physically secure environment system of clause 1, wherein the at least one administrative privilege for the allocated SUC precious metal units of the first lot for the trusted partner is based on an e-commerce financial transaction platform.

Clause 12. The physically secure environment system of clause 1, wherein the at least one administrative privilege for the allocated SUC precious metal units of the first lot for the trusted partner is based on a social media platform.

Clause 13. The physically secure environment system of clause 1, wherein the at least one administrative privilege for the allocated SUC precious metal units of the first lot for the trusted partner is based on a banking or financial services provider or platform.

Clause 14. The physically secure environment system of clause 1, wherein the at least one administrative privilege for the allocated SUC precious metal units of the first lot for the trusted partner is based on one of a brokerage institution or trading company.

Clause 15. The physically secure environment system of clause 1, wherein the at least one administrative privilege for the allocated SUC precious metal units of the first lot for the trusted partner is based on an Original Equipment Manufacturer (OEM) financing service or OEM payment platform.

Clause 16. The physically secure environment system of clause 1, wherein the authorizing the at least one administrative privilege for the allocated SUC precious metal units of the first lot for the trusted partner outside of the physically secure environment further includes authorizing the trusted partner to manage purchasing, selling and assigning of ownership of allocated SUC precious metal units of the first lot of the trusted partner.

Clause 17. The physically secure environment system of clause 1, wherein the authorizing the at least one administrative privilege for the allocated SUC precious metal units of the first lot for the trusted partner outside of the physically secure environment further includes authorizing the trusted partner to manage processing a request for physical delivery of at least one allocated SUC precious metal unit of the first lot of the trusted partner.

Clause 18. The physically secure environment system of clause 1, wherein the authorizing the at least one administrative privilege for the allocated SUC precious metal units of the first lot for the trusted partner outside of the physically secure environment further includes authorizing the trusted partner to manage subdivision of an interest of one allocated SUC precious metal unit of the first lot of the trusted partner and subsequent purchase, sale and assignment of ownership of at least one subdivided interest of the allocated SUC precious metal unit of the first lot.

Clause 19. A physically secure environment system comprising: a physically secure environment configured to receive precious metal thereto, to retain precious metal therein, and release precious metal therefrom; and a registration system configured to record and maintain records containing precious metal identification, location, lot and certification information; wherein the physically secure environment system being configured to receive precious metal thereto by certifying the received precious metal based on one of a plurality of predetermined mass values, and one of a plurality of predetermined purity values thereby constituting a unit of certified standard uniform characteristic (SUC) precious metal; wherein the physically secure environment system being further configured to retain precious metal therein by allocating a portion of a total quantity of certified SUC precious metal units in a first location within the physically secure environment to be associated with a first lot and creating a first private registry with corresponding records associated with the allocated portion of certified SUC precious metal units in the first location, and authorizing at least one administrative privilege for the allocated SUC precious metal units of the first lot for a trusted partner outside of the physically secure environment; wherein the physically secure environment system being further configured to release precious metal therein by removing the location information from a corresponding record in the registration system, and inserting de-processing information into the corresponding record in the registration system.

Clause 20. A method of allocating a portion of a total quantity of certified SUC precious metal units held within a physically secure environment system, the method comprising: providing a physically secure environment configured to receive precious metal thereto, to retain precious metal therein, and release precious metal therefrom; and providing a registration system configured to record and maintain records containing precious metal identification, location, lot and certification information; certifying the precious metal based on one of a plurality of predetermined mass values, and one of a plurality of predetermined purity values thereby constituting a unit of certified standard uniform characteristic (SUC) precious metal; allocating, by the physically secure environment system, at least a portion of a total quantity of certified SUC precious metal units in a first location within the physically secure environment to be associated with a first lot, and creating a private registry with corresponding records associated with the allocated portion of certified SUC precious metal units in the first location; authorizing at least one administrative privilege for the allocated SUC precious metal units of the first lot for a trusted partner outside of the physically secure environment; providing, to the trusted partner, access to the private registry to manage the allocated SUC precious metal units of the first lot; and de-processing, in response to a request, precious metal from the physically secure environment by removing the location information from a corresponding record in the registration system, and inserting de-processing information into the corresponding record in the registration system.

The foregoing description, for purpose of explanation, has been described with reference to specific arrangements and configurations. However, the illustrative examples provided herein are not intended to be exhaustive or to limit aspects of the disclosed subject matter to the precise forms disclosed. Many modifications and variations are possible in view of the disclosure provided herein. The aspects and arrangements were chosen and described in order to explain the principles of aspects of the disclosed subject matter and their practical applications. Various modifications may be used without departing from the scope or content of the disclosure and claims presented herein.

What is claimed is:

1. A physically secure environment system comprising:
   a physically secure environment configured to receive precious metal thereto, to retain precious metal therein, and release precious metal therefrom; and
   a registration system configured to record and maintain records comprising
      unique precious metal identification information,
      physically secure location information of precious metal,
      lot identification information of precious metal, and
      one of certification information or de-processing information of precious metal;
   wherein the physically secure environment system being configured to receive precious metal thereto by
      processing, within the physically secure environment, the received precious metal into one of a plurality of predetermined mass values and one of a plurality of predetermined purity values to thereby constitute a unit of certified standard uniform characteristic (SUC) precious metal;
   wherein the physically secure environment system being further configured to retain precious metal therein by
      allocating a portion of a total quantity of certified SUC precious metal units in a first location within the physically secure environment to be associated with a first lot and creating a first private registry with corresponding records associated with the allocated portion of certified SUC precious metal units in the first location,
      authorizing at least one administrative privilege for the allocated SUC precious metal units of the first lot for a trusted partner outside of the physically secure environment; and
   wherein the physically secure environment system being further configured to release precious metal therefrom.

2. The physically secure environment system of claim 1, wherein receiving the precious metal into the physically secure environment system further includes registering the certified SUC precious metal unit by providing a registration indicia on one of the certified SUC precious metal unit or a container containing the certified SUC precious metal unit, and creating and storing a record within the registration system associated with the certified SUC precious metal unit.

3. The physically secure environment system of claim 1, wherein the allocating the portion of the total quantity of certified SUC precious metal includes one of:
   setting a fixed quantity of certified SUC precious metal for the first lot;
   setting a maximum replenishment quantity of certified SUC precious metal for the first lot;
   setting a minimum quantity of certified SUC precious metal for the first lot; and
   setting a predetermined incremental replenishment quantity of certified SUC precious metal for the first lot.

4. The physically secure environment system of claim 1, wherein the at least one administrative privilege for the allocated SUC precious metal units of the first lot for the trusted partner is based on a territorial law or regulation.

5. The physically secure environment system of claim 1, wherein the at least one administrative privilege for the allocated SUC precious metal units of the first lot for the trusted partner is based on a financial law or regulation.

6. The physically secure environment system of claim 1, wherein the at least one administrative privilege for the allocated SUC precious metal units of the first lot for the trusted partner is based on at least one of government entity or sovereign entity.

7. The physically secure environment system of claim 1, wherein the at least one administrative privilege for the allocated SUC precious metal units of the first lot for the trusted partner is based on at least one of a geophysical region or geopolitical jurisdiction.

8. The physically secure environment system of claim 1, wherein the at least one administrative privilege for the allocated SUC precious metal units of the first lot for the trusted partner is based on at least one of a local, national or regional currency.

9. The physically secure environment system of claim 1, wherein the at least one administrative privilege for the allocated SUC precious metal units of the first lot for the trusted partner is based on an e-commerce financial transaction platform.

10. The physically secure environment system of claim 1, wherein the at least one administrative privilege for the allocated SUC precious metal units of the first lot for the trusted partner is based on a social media platform.

11. The physically secure environment system of claim 1, wherein the at least one administrative privilege for the allocated SUC precious metal units of the first lot for the trusted partner is based on a banking or financial services provider or platform.

12. The physically secure environment system of claim 1, wherein the at least one administrative privilege for the allocated SUC precious metal units of the first lot for the trusted partner is based on one of a brokerage institution or trading company.

13. The physically secure environment system of claim 1, wherein the at least one administrative privilege for the allocated SUC precious metal units of the first lot for the trusted partner is based on an Original Equipment Manufacturer (OEM) financing service or OEM payment platform.

14. The physically secure environment system of claim 1, wherein the authorizing the at least one administrative privilege for the allocated SUC precious metal units of the first lot for the trusted partner outside of the physically secure environment further includes authorizing the trusted partner to manage purchasing, selling and assigning of ownership of allocated SUC precious metal units of the first lot of the trusted partner.

15. The physically secure environment system of claim 1, wherein the authorizing the at least one administrative privilege for the allocated SUC precious metal units of the first lot for the trusted partner outside of the physically secure environment further includes authorizing the trusted partner to manage processing a request for physical delivery of at least one allocated SUC precious metal unit of the first lot of the trusted partner.

16. The physically secure environment system of claim 1, wherein the authorizing the at least one administrative privilege for the allocated SUC precious metal units of the first lot for the trusted partner outside of the physically secure environment further includes authorizing the trusted partner to manage subdivision of an interest of one allocated SUC precious metal unit of the first lot of the trusted partner and subsequent purchase, sale and assignment of ownership of at least one subdivided interest of the allocated SUC precious metal unit of the first lot.

17. The physically secure environment system of claim 1, wherein the at least one administrative privilege provides access the corresponding records of the first private registry for the allocated SUC precious metal units of the first lot for the trusted partner.

18. A physically secure environment system comprising:
a physically secure environment configured to receive precious metal thereto, to retain precious metal therein, and release precious metal therefrom; and
a registration system configured to record and maintain records containing precious metal identification, location, lot and certification information;
wherein the physically secure environment system being configured to receive precious metal thereto by
processing, within the physically secure environment, the received precious metal into one of a plurality of predetermined mass values and one of a plurality of predetermined purity values to thereby constitute a unit of certified standard uniform characteristic (SUC) precious metal;
wherein the physically secure environment system being further configured to retain precious metal therein by
allocating a portion of a total quantity of certified SUC precious metal units in a first location within the physically secure environment to be associated with a first lot and creating a first private registry with corresponding records associated with the allocated portion of certified SUC precious metal units in the first location, and
authorizing at least one administrative privilege for the allocated SUC precious metal units of the first lot for a trusted partner outside of the physically secure environment; and
wherein the physically secure environment system being further configured to release precious metal therefrom.

19. A method of allocating a portion of a total quantity of certified SUC precious metal units held within a physically secure environment system, the method comprising:
providing a physically secure environment configured to receive precious metal thereto, to retain precious metal therein, and release precious metal therefrom;
providing a registration system configured to record and maintain records containing precious metal identification, location, lot and certification information;
processing, within the physically secure environment, the received precious metal into one of a plurality of predetermined mass values and one of a plurality of predetermined purity values to thereby constitute a unit of certified standard uniform characteristic (SUC) precious metal;
allocating, by the physically secure environment system, at least a portion of a total quantity of certified SUC precious metal units in a first location within the physically secure environment to be associated with a first lot, and creating a private registry with corresponding records associated with the allocated portion of certified SUC precious metal units in the first location;
authorizing at least one administrative privilege for the allocated SUC precious metal units of the first lot for a trusted partner outside of the physically secure environment; and
providing, to the trusted partner, access to the private registry to manage the allocated SUC precious metal units of the first lot.

* * * * *